United States Patent
Shibata et al.

(10) Patent No.: US 9,899,888 B2
(45) Date of Patent: Feb. 20, 2018

(54) COIL STRUCTURE FOR ROTARY ELECTRIC MACHINE

(71) Applicant: HONDA MOTOR CO., LTD., Tokyo (JP)

(72) Inventors: Takumi Shibata, Wako (JP); Yoshihisa Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 741 days.

(21) Appl. No.: 14/297,551

(22) Filed: Jun. 5, 2014

(65) Prior Publication Data
US 2015/0022046 A1 Jan. 22, 2015

(30) Foreign Application Priority Data
Jul. 18, 2013 (JP) .................. 2013-149939

(51) Int. Cl.
*H02K 3/12* (2006.01)
*H02K 3/28* (2006.01)

(52) U.S. Cl.
CPC .................. *H02K 3/28* (2013.01); *H02K 3/12* (2013.01)

(58) Field of Classification Search
CPC ............... H02K 3/12; H02K 3/14; H02K 3/28
USPC ........................................................ 310/208
See application file for complete search history.

(56) References Cited

U.S. PATENT DOCUMENTS 7,034,428 B2 4/2006 Cai et al.

| 2003/0132680 A1* | 7/2003 | Nakamura | H02K 3/28 310/180 |
| 2004/0061400 A1* | 4/2004 | Fukushima | H02K 3/28 310/184 |

FOREIGN PATENT DOCUMENTS

| JP | 2003-209956 | 7/2003 |
| JP | 2004-166316 | 6/2004 |
| JP | 2012-029370 | 2/2012 |
| JP | 2012-165624 | 8/2012 |
| JP | 2013-009523 | 1/2013 |

OTHER PUBLICATIONS

Japanese Office Action for corresponding JP Application No. 2013-149939, dated Sep. 27, 2016 (w/ English machine translation).

* cited by examiner

*Primary Examiner* — Quyen Leung
*Assistant Examiner* — Eric Johnson
(74) *Attorney, Agent, or Firm* — Mori & Ward, LLP

(57) ABSTRACT

A coil structure for a rotary electric machine includes phase coils for magnetic flux generation. Each of the phase coils includes a plurality of first element conductors, a plurality of second element conductors, a plurality of first crossover portions, and a plurality of second crossover portions. The plurality of second element conductors are provided in a plurality of second slots among slots. The second slots are provided in a circumferential direction of a stator at a pitch of a first predetermined interval. The second slots are shifted in phase by a second predetermined interval with respect to first slots in the circumferential direction of the stator. The first predetermined interval is set to be an interval equivalent to N times a unit pitch. The second predetermined interval is set to be an interval smaller than the first predetermined interval.

15 Claims, 10 Drawing Sheets

FIG. 4

| Slot | 41 | 42 | 43 | 44 | 45 | 46 | 47 | 48 | 49 | 50 | 51 | 52 | 53 | 54 |
|---|---|---|---|---|---|---|---|---|---|---|---|---|---|---|
| (8) | 88u | 88u | 5w | 5w | 88v | 88v | 9u | 9u | 88w | 88w | 9v | 9v | 84u | 84u |
| (7) | 8u | 8u | 89w | 89w | 8v | 8v | 85u | 85u | 8w | 8w | 85v | 85v | 12u | 12u |
| (6) | 64u | 64u | 29w | 29w | 64v | 64v | 33u | 33u | 64w | 64w | 33v | 33v | 60u | 60u |
| (5) | 32u | 32u | 65w | 65w | 32v | 32v | 61u | 61u | 32w | 32w | 61v | 61v | 36u | 36u |
| (4) | 6u | 91w | 91w | 6v | 6v | 87u | 87u | 6w | 6w | 87v | 87v | 10u | 10u | 87w |
| (3) | 90u | 3w | 3w | 90v | 90v | 7u | 7u | 90w | 90w | 7v | 7v | 86u | 86u | 7w |
| (2) | 30u | 67w | 67w | 30v | 30v | 63u | 63u | 30w | 30w | 63v | 63v | 34u | 34u | 63w |
| (1) | 66u | 27w | 27w | 66v | 66v | 31u | 31u | 66w | 66w | 31v | 31v | 62u | 62u | 31w |

| Slot | 55 | 56 | 57 | 58 | 59 | 60 | 61 | 62 | 63 | 64 | 65 | 66 | 67 | 68 |
|---|---|---|---|---|---|---|---|---|---|---|---|---|---|---|
| (8) | 9w | 9w | 84v | 84v | 13u | 13u | 84v | 84w | 13v | 13v | 80u | 80u | 13w | 13w |
| (7) | 85w | 85w | 12v | 12v | 81u | 81u | 12w | 12w | 81v | 81v | 16u | 16u | 81w | 81w |
| (6) | 33w | 33w | 60v | 60v | 37u | 37u | 60w | 60w | 37v | 37v | 56u | 56u | 37w | 37w |
| (5) | 61w | 61w | 36v | 36v | 57u | 57u | 36w | 36w | 57v | 57v | 40u | 40u | 57w | 57w |
| (4) | 87w | 10v | 10v | 83u | 83u | 10w | 10w | 83v | 83v | 14u | 14u | 83w | 83w | 14v |
| (3) | 7w | 86v | 86v | 11u | 11u | 86w | 86w | 11v | 11v | 82u | 82u | 11w | 11w | 82v |
| (2) | 63w | 34v | 34v | 59u | 59u | 34w | 34w | 59v | 59v | 38u | 38u | 59w | 59w | 38v |
| (1) | 31w | 62v | 62v | 35u | 35u | 62w | 62w | 35v | 35v | 58u | 58u | 35w | 35w | 58v |

| Slot | 69 | 70 | 71 | 72 | 1 | 2 |
|---|---|---|---|---|---|---|
| (8) | 80v | 80v | 17u | 17u | 80w | 80w |
| (7) | 16v | 16v | 77u | 77u | 16w | 16w |
| (6) | 56v | 56v | 41u | 41u | 56w | 56w |
| (5) | 40v | 40v | 53u | 53u | 40w | 40w |
| (4) | 14v | 79u | 79u | 14w | 14w | 79v |
| (3) | 82v | 15u | 15u | 82w | 82w | 15v |
| (2) | 38v | 55u | 55u | 38w | 38w | 55v |
| (1) | 58v | 39u | 39u | 58w | 58w | 39v |

COIL STRUCTURE FOR ROTARY ELECTRIC MACHINE

CROSS-REFERENCE TO RELATED APPLICATIONS

The present application claims priority under 35 U.S.C. §119 to Japanese Patent Application No. 2013-149939, filed Jul. 18, 2013, entitled "Coil Structure for Rotary Electric Machine." The contents of this application are incorporated herein by reference in their entirety.

BACKGROUND

1. Field

The present disclosure relates to a coil structure for a rotary electric machine.

2. Description of the Related Art

In known conventional structures of coils for magnetic flux generation, the coils being mounted on a stator of a rotary electric machine, are disclosed, for example, in Japanese Unexamined Patent Application Publication (JP-A) No. 2012-29370 and U.S. Pat. No. 7,034,428.

The coils disclosed in JP-A No. 2012-29370 and U.S. Pat. No. 7,034,428 each have a structure obtained by connecting in series a plurality of element conductors via crossover portions provided on one end side and the other end side of the stator in the axial direction, the element conductors being inserted in slots which are formed in the stator of the rotary electric machine.

SUMMARY

According to one aspect of the present invention, a coil structure for a rotary electric machine includes phase coils for magnetic flux generation. The phase coils include a plurality of element conductors inserted in a plurality of slots and arranged as multiple layers in each of the slots in a radial direction of a stator. The slots are formed in the stator and aligned in a circumferential direction of the stator. Each of the phase coils is formed by connecting a predetermined number of the element conductors in series. Each of the phase coils include a plurality of first element conductors, a plurality of second element conductors, a plurality of first crossover portions, and a plurality of second crossover portions. The plurality of first element conductors are inserted in a plurality of first slots out of the slots. The first slots are arranged at a pitch of a first predetermined interval in the circumferential direction of the stator. The plurality of second element conductors are inserted in a plurality of second slots arranged at a pitch of the first predetermined interval in the circumferential direction of the stator. The second slots are shifted in phase by a second predetermined interval with respect to the first slots in the circumferential direction of the stator. The plurality of first crossover portions are configured to connect pairs of one of the first element conductors and one of the second element conductors on a first end side which is one end side of the stator in the axial direction. Each of the pairs of the first element conductor and the second element conductor is to be connected and respectively inserted in one of the first slots and one of the second slots. The one first slot and the one second slot have the second predetermined interval in the circumferential direction of the stator. The plurality of second crossover portions are configured to each connect a pair of two first element conductors or a pair of two second element conductors on a second end side which is the other end side of the axial direction of the stator. The pair of two first element conductors is to be connected and inserted in two first slots having the first predetermined interval in the circumferential direction of the stator. The pair of two second element conductors is to be connected and inserted in two second slots having the first predetermined interval in the circumferential direction of the stator. When unit pitch is defined as an interval between two adjacent slots in the circumferential direction of the stator and N is defined as the number of slots per pole in magnetic poles of the rotary electric machine, the first predetermined interval is set to an interval equivalent to N times the unit pitch, and the second predetermined interval is set to an interval smaller than the first predetermined interval.

According to another aspect of the present invention, a coil structure for a rotary electric machine includes phase coils for magnetic flux generation including a plurality of element conductors provided in a plurality of slots and arranged as multiple layers in each of the slots in a radial direction of a stator. The slots are provided in the stator and aligned in a circumferential direction of the stator. Each of the phase coils includes a predetermined number of the element conductors connected in series and includes a plurality of first element conductors, a plurality of second element conductors, a plurality of first crossover portions, and a plurality of second crossover portions. The plurality of first element conductors are provided in a plurality of first slots among the slots. The first slots are provided in the circumferential direction of the stator at a pitch of a first predetermined interval. The plurality of second element conductors are provided in a plurality of second slots among the slots. The second slots are provided in the circumferential direction of the stator at the pitch of the first predetermined interval. The second slots are shifted in phase by a second predetermined interval with respect to the first slots in the circumferential direction of the stator. The plurality of first crossover portions connect pairs of one of the first element conductors and one of the second element conductors on a first end side which is one end side of the stator in the axial direction. Each of the pairs is to be connected and respectively inserted into one of the first slots and one of the second slots. The one first slot and the one second slot have the second predetermined interval in the circumferential direction of the stator. The plurality of second crossover portions each connect a pair of two first element conductors or a pair of two second element conductors on a second end side which is the other end side of the axial direction of the stator. The pair of two first element conductors is to be connected and inserted into two first slots having the first predetermined interval in the circumferential direction of the stator. The pair of two second element conductors is to be connected and inserted into two second slots having the first predetermined interval in the circumferential direction of the stator. The first predetermined interval is set to be an interval equivalent to N times a unit pitch. The second predetermined interval is set to be an interval smaller than the first predetermined interval. The unit pitch is defined as an interval between two adjacent slots in the circumferential direction of the stator and N is defined as a number of slots per pole in magnetic poles of the rotary electric machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a diagram illustrating an arrangement of element conductors included in the coils of each phase in the embodiment.

DESCRIPTION OF THE EMBODIMENTS

Figure 1:
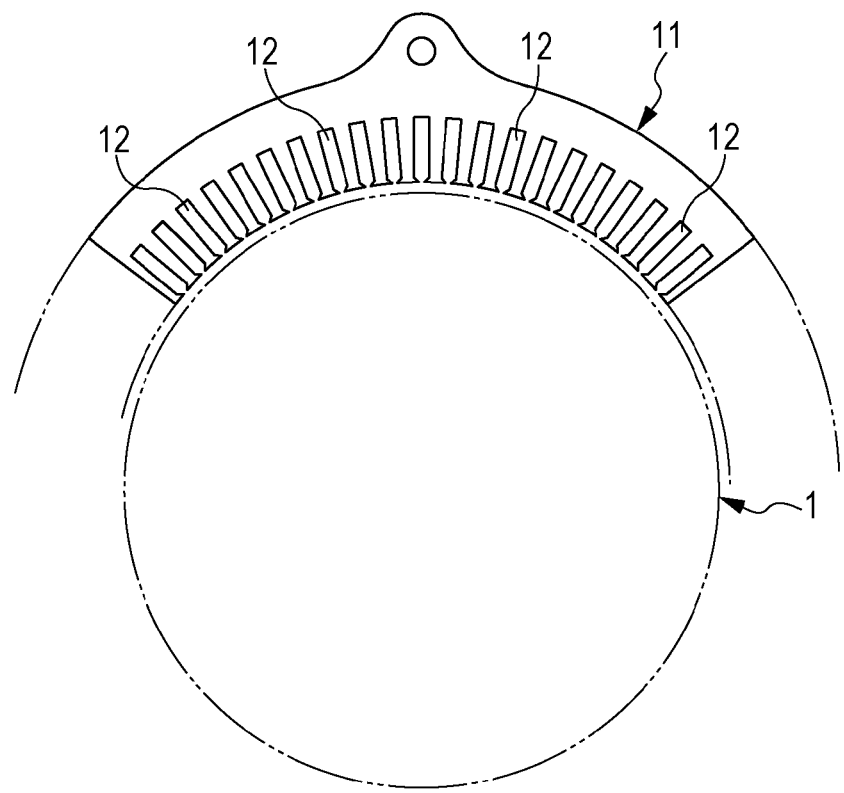
FIG. 1 is a diagram illustrating an arrangement of slots of a stator of a rotary electric machine according to an embodiment of the present disclosure.

The embodiments will now be described with reference to the accompanying drawings, wherein like reference numerals designate corresponding or identical elements throughout the various drawings.

An embodiment of the present disclosure will be described with reference to FIGS. 1 to 11.

A rotary electric machine in the present embodiment includes a substantially annular stator 11 which is arranged around the circumference of a rotor 1, and a coil 21 for magnetic flux generation which are mounted on the stator 11.

As illustrated in FIG. 1, a plurality of slots 12 are formed in the stator 11 so as to be arranged at regular pitches in the circumferential direction (the direction around the axial center of the stator 11) of the stator 11. Each of the slots 12 is provided so as to penetrate through the stator 11 in the axial direction.

Figure 2:
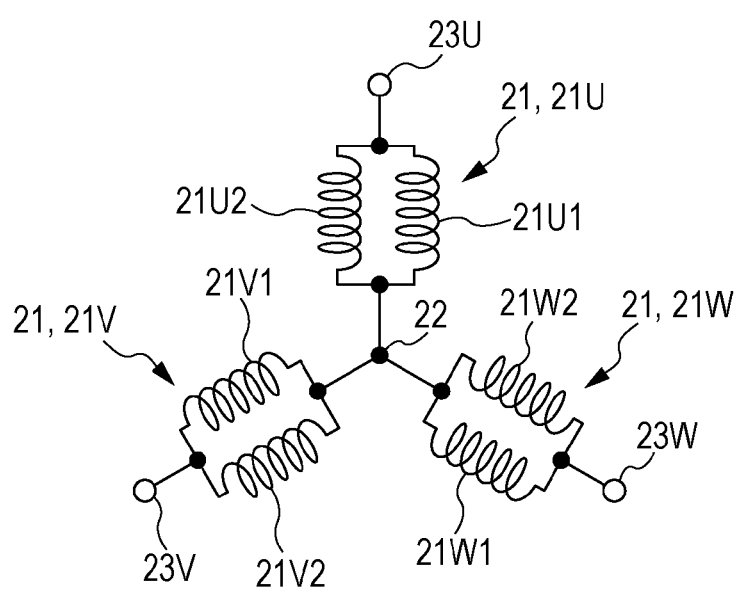
FIG. 2 is a circuit diagram illustrating an entire circuit configuration of the rotary electric machine according to the embodiment.

As illustrated in FIG. 2, the coil 21 includes three phase coils: U-phase coil 21U, V-phase coil 21V, and W-phase coil 21W. In the present embodiment, the coils 21U, 21V, and 21W of each phase respectively include two coils (21U1, 21U2), (21V1, 21V2), and (21W1, 21W2) which are connected in parallel. Respective one ends of the U-phase coil 21U, V-phase coil 21V, and W-phase coil 21W are connected with each other via a neutral point 22.

It should be noted that the U-phase coil 21U, V-phase coil 21V, and W-phase coil 21W correspond to the first phase coil, the second phase coil, and the third phase coil, respectively, in the present disclosure.

In the following description, when it is not necessary to distinguish between the phase coils 21U, 21V, and 21W, any phase coil is denoted as coil 21X. In this notation, "X" indicates one of U, V, and W. The two coils included in a phase coil 21X are denoted as a first coil 21X1 and a second coil 21X2, and the current I/O terminal of the coil 21X is denoted as current I/O terminal 23X.

Figure 3:
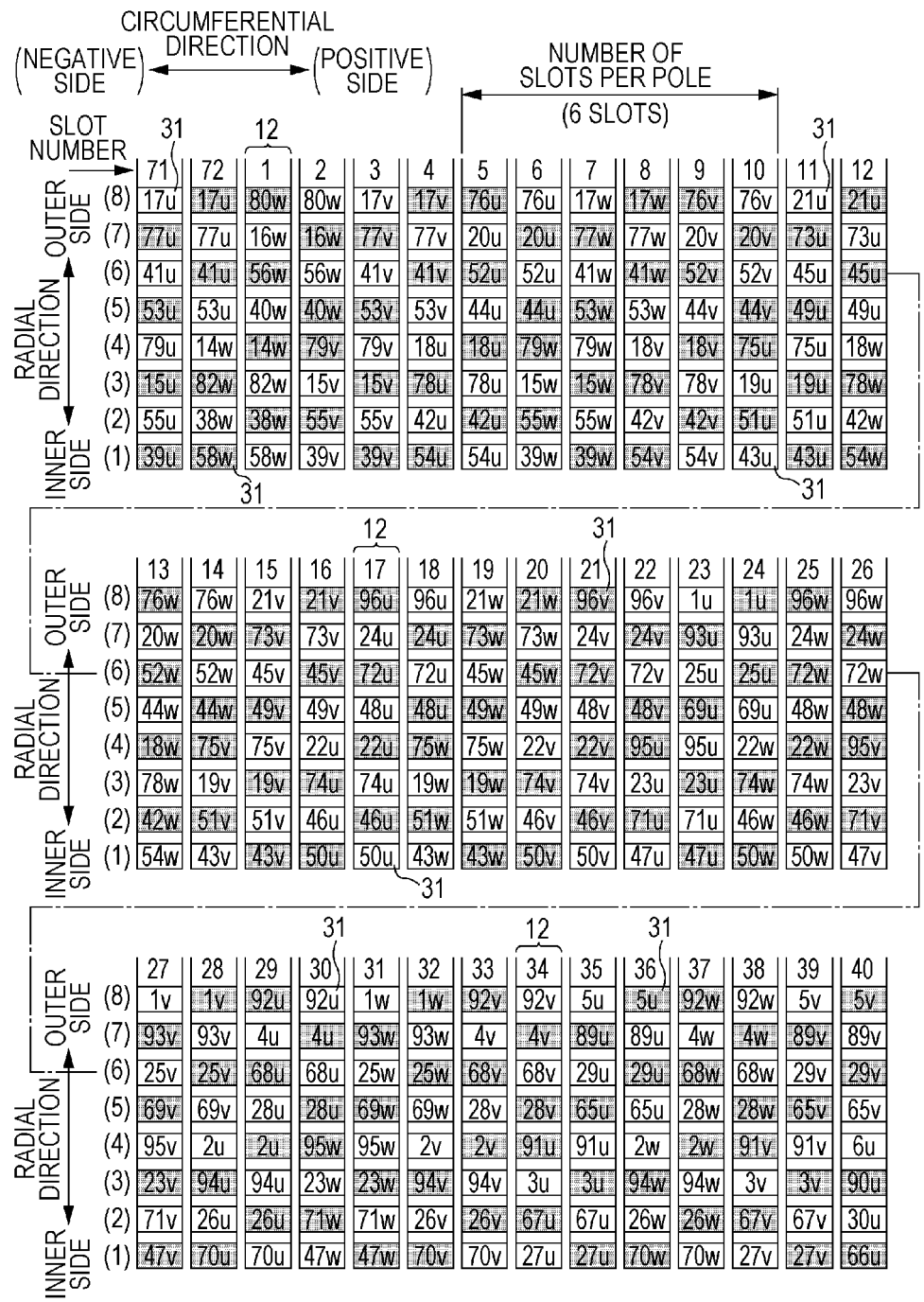
FIG. 3 is a diagram illustrating an arrangement of element conductors included in the coils of each phase in the embodiment.

As illustrated in FIGS. 3 and 4, each of the first coil 21X1 and the second coil 21X2 of any phase includes, as components, a predetermined number of linear element conductors 31 which are inserted in the slots 12. Each of the element conductors 31 extends in the axial direction of the stator 11 and is inserted in a slot 12 so as to penetrate through the slot 12.

Each of the first coil 21X1 and the second coil 21X2 of any phase is formed by connecting the above-mentioned predetermined number of linear element conductors 31 in series so as to allow electrical conduction sequentially (in other words, so as to form a continuous current path).

In FIGS. 3 and 4, it is assumed that the direction perpendicular to the paper surface is the axial direction of the stator 11, the horizontal direction is the circumferential direction of the stator 11, and the vertical direction is the radial direction of the stator 11, and each of the element conductors 31 is viewed in the axial direction of the stator 11. In the above, the element conductors 31 of the first coil 21X1 are each indicated as a white box and the element conductors 31 of the first coil 21X2 are each indicated as a gray box.

In FIGS. 3 and 4, the numbers in symbols (such as 17u, 80w) attached to the element conductors 31 of each of the first coil 21X1 and the second coil 21X2 of any phase indicate the order of connection (order of conduction) of the element conductors 31 from the current I/O terminal 23X to the neutral point 22. Also, u, v, or w in the symbols indicates which phase out of U phase, V phase, and W phase, each element conductor 31 belongs to.

It should be noted that the arrangement and the order of connection of the element conductors 31 indicated in FIGS. 3 and 4 are as viewed from one end side (below-described first end side) in the axial direction of the stator 11.

In the present embodiment, the number of pole pairs (the number of pairs of N pole and S pole) of the magnetic poles of the rotary electric machine is, for example, six pole pairs (totally 12 poles). As described above, the number of phases of the coil 21 is three, and the coil 21X of each phase includes the first coil 21X1 and the second coil 21X2 which are connected in parallel.

For this reason, in the present embodiment, the number of slots N per pole is given by N=3×2=6 pieces as illustrated in FIGS. 3 and 4. Thus, the total of 72 (=6×12) pieces of slots are formed in the stator 11. Also, eight element conductors 31 are inserted in each slot 12 so as to be aligned (aligned in eight layers) in a single row in the radial direction of the stator 11.

In the present embodiment, the first coil 21X1 and the second coil 21X2 of any phase each have 96 element conductors 31 (1st to 96th element conductors 31). Each of the first coil 21X1 and the second coil 21X2 of any phase is formed by connecting the 96 element conductors 31 inserted in the slots 12 in series so as to allow electrical conduction in the numerical order as illustrated in FIGS. 3 and 4.

Hereinafter, a more specific structure of the first coil 21X1 and the second coil 21X2 of any phase will be described in detail.

First, the first coil 21X1 of any phase will be described with reference to FIGS. 3 to 8. It should be noted that in the subsequent description, the arrangement positions in the radial direction of the stator 11 of eight element conductors 31 inserted in each slot 12 are referred to as a first layer, a second layer, . . . , an eighth layer from the inner side (radially inner side) to the outer side (radially outer side) in the radial direction of the stator 11.

Also, a predetermined direction out of two directions: a clockwise direction and a counterclockwise direction in the circumferential direction of the stator 11 is referred to as a positive circumferential direction and the opposite direction to the predetermined direction is referred to as a negative circumferential direction. In description of the present embodiment, for the sake of convenience, the positive circumferential direction is defined as the rightward direction in FIGS. 3 to 8 and the negative circumferential direction is defined as the leftward direction in FIGS. 3 to 8.

In the present embodiment, the first coil 21X1 of any phase is formed by connecting four partial coils in series, a first partial coils (hereinafter referred to as 1st to 24th partial coils) being formed by connecting 1st to 24th element conductors 31 in series, a second partial coils (hereinafter referred to as 25th to 48th partial coils) being formed by connecting 25th to 48th element conductors 31 in series, a third partial coils (hereinafter referred to as 49th to 72nd partial coils) being formed by connecting 49th to 72nd element conductors 31 in series, a fourth partial coils (hereinafter referred to as 73rd to 96th partial coils) being formed by connecting 73rd to 96th element conductors 31 in series.

The arrangement and connection configuration of the element conductors 31 of the first coil 21X1 are mainly divided into the configuration of the 1st to 24th partial coils, the configuration of the 25th to 48th partial coils, the configuration of the 49th to 72nd partial coils, and the configuration of the 73rd to 96th partial coils.

In addition, the element conductors 31 (24 element conductors 31) included in the above-mentioned each partial coils of the first coil 21X1 are divided into a first element conductor group and a second element conductor group, the first element conductor group including a plurality of element conductors which are respectively inserted in a plurality of slots 12 arranged in the circumferential direction of the stator 11 at a pitch of a first predetermined interval, the second element conductor group including the plurality of element conductors 31 which are respectively inserted in a plurality of slots 12 arranged in the circumferential direction of the stator 11 at the pitch of the first predetermined interval with a phase shifted in the circumferential direction of the stator 11 with respect to the slots 12 in which the element conductors 31 of the first element conductor group are inserted.

Each element conductor 31 in the first element conductor group corresponds to the first element conductor in the present disclosure, and each element conductor 31 in the second element conductor group corresponds to the second element conductor in the present disclosure. In addition, the slot 12 in which each first element conductor 31 is inserted and the slot 12 in which each second element conductor 31 is inserted respectively correspond to the first slot and the second slot in the present disclosure.

In this configuration, in each of the 1st to 24th partial coils, the 25th to 48th partial coils, the 49th to 72nd partial coils, and the 73rd to 96th partial coils of the first coil 21X1, the slots 12 in which the element conductors 31 (hereinafter may be referred to as second element conductors 31) of the second element conductor group are inserted, are shifted in phase in the positive circumferential direction of the stator 11 by a second predetermined interval with respect to the slots 12 in which the element conductors 31 (hereinafter may be referred to as first element conductors 31) of the first element conductor group are inserted, the second predetermined interval being smaller than the first predetermined interval.

In the present embodiment, the above-mentioned first element conductors 31 are each arranged in a layer (one of the 5th to 8th layers) on the radially outer side of the stator 11. Also, the above-mentioned second element conductors 31 are each arranged in a layer (one of the 1st to 4th layers) on the radially inner side of the stator 11.

Here, in the present description, the "interval" between any two slots 12, 12 in the circumferential direction of the stator 11, such as the above-mentioned first predetermined interval, second predetermined interval, corresponds to the difference between the angle positions (phases) of the slots 12, 12 around the axial center of the stator 11.

The above-mentioned first predetermined interval is the interval (=6×unit pitch) obtained by multiplying the unit pitch of the slots 12 (the interval between two adjacent slots 12, 12 in the circumferential direction of the stator 11) by the number of slots per pole (6 pieces in the present embodiment) of the rotary electric machine.

Hereinafter, k slot pitch refers to the interval which is k times the unit pitch of the slots 12. In the present embodiment, the first predetermined interval is 6 slot pitch.

Also, the second predetermined interval is set to be a smaller interval than the first predetermined interval. In the present embodiment, the second predetermined interval is set to be 5 times the unit pitch of the slots 12, that is, 5 slot pitch.

The arrangement and connection configuration of the element conductors 31 in each of the 1st to 24th partial coils, the 25th to 48th partial coils, the 49th to 72nd partial coils, and the 73rd to 96th partial coils of the first coil 21X1 of any phase will be further specifically described.

Figure 5A:
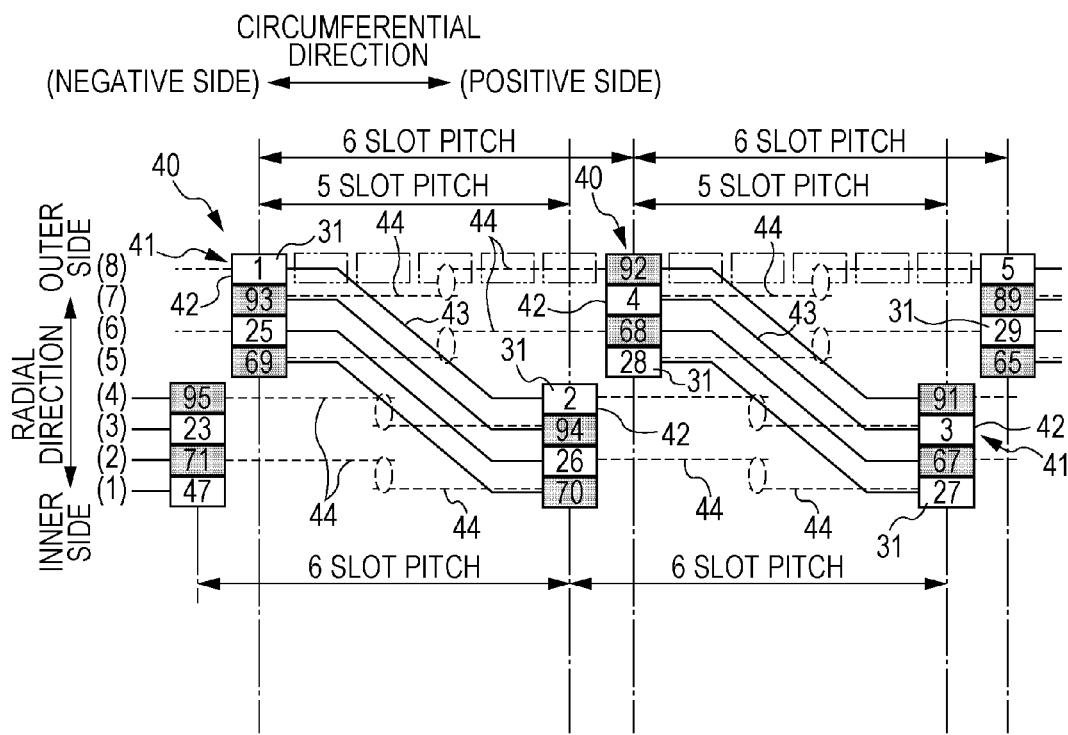
FIGS. 5A and 5B are each a diagram illustrating an arrangement and connection configuration of part of the element conductors included in the coils of each phase in the embodiment.

First, the 1st to 24th element conductors 31 included in the 1st to 24th partial coils of the first coil 21X1 are arranged in the following manner. As illustrated in FIGS. 3 and 4 or FIG. 5A, the (4n+1)th (n=0, 1, . . . , 5) element conductor 31 is located in the 8th layer in a corresponding slot 12. The subsequent (4n+2)th element conductor 31 is located in the 4th layer (the layer arranged radially inward by 4 layers from the (4n+1)th element conductor 31) in the slot 12 which is spaced away by the second predetermined interval (interval of 5 slot pitch) in the positive circumferential direction from the slot 12 in which the (4n+1)th element conductor 31 is arranged. The subsequent (4n+3)th element conductor 31 is located in the 3rd layer (the layer arranged radially inward by 1 layer from the (4n+2)th element conductor 31) in the slot 12 which is spaced away by the first predetermined interval (interval of 6 slot pitch) in the positive circumferential direction from the slot 12 in which the (4n+2)th element conductor 31 is arranged. The subsequent (4n+4)th element conductor 31 is located in the 7th layer (the layer arranged radially outward by 4 layers from the (4n+3)th element conductor 31) in the slot 12 which is spaced away by the second predetermined interval (interval of 5 slot pitch) in the negative circumferential direction from the slot 12 in which the (4n+3)th element conductor 31 is arranged.

In FIG. 5A, the 1st to 5th element conductors 31 are illustrated as one example of (4n+1)th, (4n+2)th, (4n+3)th, (4n+4)th, (4(n+1)+1)th element conductors 31 (where n=0).

In this example, due to the above-described arrangement of the (4n+1)th to (4n+4)th element conductors 31, the slot 12, in which the (4n+4)th element conductor 31 is arranged, is spaced away by an interval of 1 slot pitch (interval of the difference between the first predetermined interval and the second predetermined interval) in the positive circumferential direction from the slot 12 in which the (4n+2)th element conductor 31 is arranged, and is spaced away by the first predetermined interval (interval of 6 slot pitch) in the positive circumferential direction from the slot 12 in which the (4n+1)th element conductor 31 is arranged.

Here, the (4n+1)th and (4n+4)th element conductors 31 are the element conductors (the first element conductors) of the first element conductor group, and the (4n+2)th and (4n+3)th element conductors 31 are the element conductors (the second element conductors) of the second element conductor group. Consequently, in the 1st to 24th partial coils, each of the first element conductors 31 is arranged in the 7th layer or the 8th layer, and each of the second element conductors 31 is arranged in the 3rd layer or the 4th layer.

In the 1st to 24th element conductors 31, pairs of element conductors 31, 31 (specifically, the pair of the (4n+1)th and (4n+2)th element conductors 31, 31 and the pair of the (4n+3)th and (4n+4)th element conductors 31, 31) having the second predetermined interval (interval of 5 slot pitch) in the circumferential direction of the stator 11 and a predetermined interval (interval of 4 layers) in the radial direction of the stator 11 are each connected via a first crossover portion 43 (which will be described below in detail) on one end side in the axial direction (hereinafter referred to as a first end side in the axial direction) of the stator 11 as a pair of a first element conductor 31 and a second element conductor 31 to be connected (see FIG. 5A).

Also, pairs of element conductors 31, 31 (specifically, the pair of the (4n+2)th and (4n+3)th element conductors 31, 31 and the pair of the (4n'+4)th and (4(n'+1)+1)th element conductors 31, 31 (where n'=0, 1, . . . , 4)) having the first predetermined interval (interval of 6 slot pitch) in the circumferential direction of the stator 11 and being in adjacent layers in the radial direction of the stator 11 are each connected via a second crossover portion 44 (which will be described below in detail) on the other end side in the axial direction (hereinafter referred to as a second end side in the axial direction) of the stator 11 as a pair of two first element conductors 31, 31 or a pair of two second element conductors 31, 31 to be connected (see FIG. 5A).

In FIG. 5A, for convenience of illustration, the first crossover portion 43 is indicated by a solid line and the second crossover portion 44 is indicated by a dashed line.

Figure 5B:
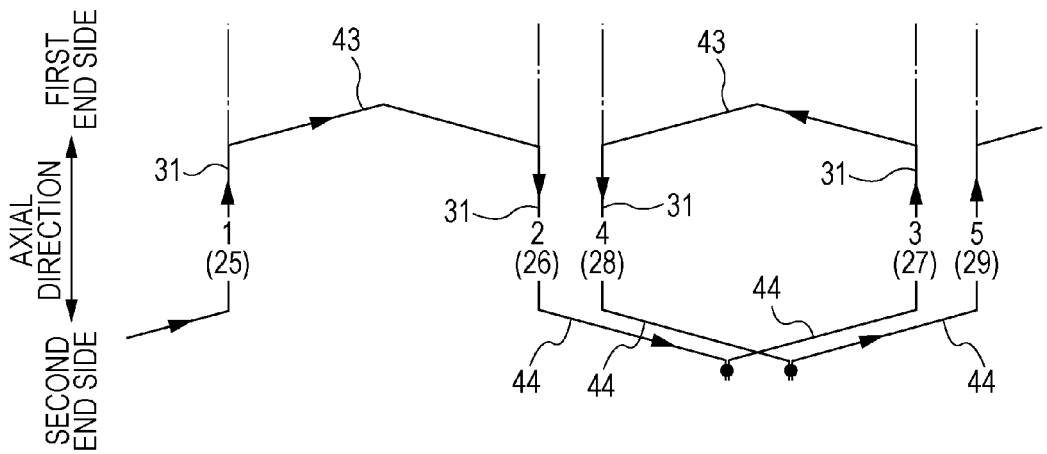

In this manner, the element conductors 31 included in the 1st to 24th partial coils are connected in series so as to allow electrical conduction sequentially in the pattern as illustrated in FIG. 5B. Thus, the 1st to 24th partial coils are formed. In this formation, when the set of the 1st to 4th element conductors 31, 31, 31, 31 connected in series in the above-described manner is defined as one element conductor group, the 1st to 24th partial coils are formed by continuously connecting 6 sets of the element conductor group at an interval of 12 slot pitch (2×the first predetermined interval) in the positive circumferential direction of the stator 11.

Next, the 25th to 48th element conductors 31 included in the 25th to 48th partial coils of the first coil 21X1 are arranged in the following manner. As illustrated in FIGS. 3 and 4 or FIG. 5A, the (4n+25)th (n=0, 1, . . . , 5) element conductor 31 is located in the 6th layer in a corresponding slot 12. The subsequent (4n+26)th element conductor 31 is located in the 2nd layer (the layer arranged radially inward by 4 layers from the (4n+25)th element conductor 31) in the slot 12 which is spaced away by the second predetermined interval (interval of 5 slot pitch) in the positive circumferential direction from the slot 12 in which the (4n+25)th element conductor 31 is arranged. The subsequent (4n+27)th element conductor 31 is located in the 1st layer (the layer arranged radially inward by 1 layer from the (4n+26)th element conductor 31) in the slot 12 which is spaced away by the first predetermined interval (interval of 6 slot pitch) in the positive circumferential direction from the slot 12 in which the (4n+26)th element conductor 31 is arranged. The subsequent (4n+28)th element conductor 31 is located in the 5th layer (the layer arranged radially outward by 4 layers from the (4n+27)th element conductor 31) in the slot 12 which is spaced away by the second predetermined interval (interval of 5 slot pitch) in the negative circumferential direction from the slot 12 in which the (4n+27)th element conductor 31 is arranged.

In FIG. 5A, the 25th to 29th element conductors 31 are illustrated as one example of (4n+25)th, (4n+26)th, (4n+27)th, (4n+28)th, (4(n+1)+25)th element conductors 31 (where n=0).

In this example, the slots 12 in which the (4n+25)th to (4n+28)th element conductors 31 are respectively arranged are the same as the slots 12 in which the (4n+1)th, (4n+2)th, (4n+3)th, (4n+4)th element conductors 31 are respectively arranged.

The (4n+25)th and (4n+28)th element conductors 31 are the element conductors (the first element conductors) of the first element conductor group, and the (4n+26)th and (4n+27)th element conductors 31 are the element conductors (the second element conductors) of the second element conductor group. Consequently, in the 25th to 48th partial coils, each of the first element conductors 31 is arranged in the 5th layer or the 6th layer, and each of the second element conductors 31 is arranged in the 1st layer or the 2nd layer.

Therefore, the arrangement of the element conductors 31 in the 25th to 48th partial coils are obtained by shifting the entire arrangement of the element conductors 31 in the 1st to 24th partial coils radially inward of the stator 11 by 2 layers.

Similarly to the case of the 1st to 24th partial coils, in the 25th to 48th element conductors 31, pairs of element conductors 31, 31 (specifically, the pair of the (4n+25)th and (4n+26)th element conductors 31, 31 and the pair of the (4n+27)th and (4n+28)th element conductors 31, 31) having the second predetermined interval (interval of 5 slot pitch) in the circumferential direction of the stator 11 and a predetermined interval (interval of 4 layers) in the radial direction of the stator 11 are each connected via the first crossover portion 43 on the first end side in the axial direction of the stator 11 as a pair of a first element conductor 31 and a second element conductor 31 to be connected (see FIG. 5A).

Also, pairs of element conductors 31, 31 (specifically, the pair of the (4n+26)th and (4n+27)th element conductors 31, 31 and the pair of the (4n'+28)th and (4n'+29)th element conductors 31, 31 (where n'=0, 1, . . . , 4)) having the first predetermined interval (interval of 6 slot pitch) in the circumferential direction of the stator 11 and being in adjacent layers in the radial direction of the stator 11 are each connected via the second crossover portion 44 on the second end side in the axial direction of the stator 11 as a pair of two first element conductors 31, 31 or a pair of two second element conductors 31, 31 to be connected (see FIG. 5B).

In this manner, the element conductors 31 included in the 25th to 48th partial coils are connected in series so as to allow electrical conduction sequentially in the same pattern as the case of the 1st to 24th partial coils illustrated in FIG. 5B. Thus, the 25th to 48th partial coils are formed.

In this formation, when the set of the 25th to 28th element conductors 31, 31, 31, 31 connected in series in the above-described manner is defined as one element conductor group, the 25th to 48th partial coils are formed by continuously connecting 6 sets of the element conductor group at an interval of 12 slot pitch (2×the first predetermined interval) in the positive circumferential direction of the stator 11.

Figure 7A:
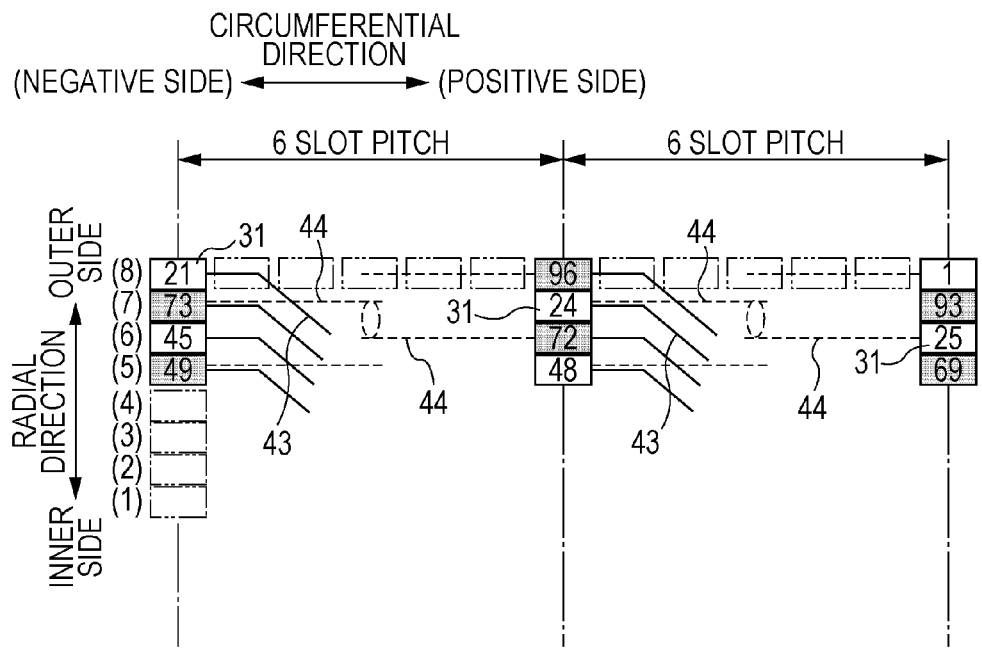
FIGS. 7A and 7B are each a diagram illustrating an arrangement and connection configuration of part of the element conductors included in the coils of each phase in the embodiment.

It should be noted that as illustrated in FIG. 7A, the 24th element conductor 31 in the 1st to 24th partial coils and the 25th element conductor 31 in the 25th to 48th partial coils are arranged in the slots 12, 12 having the first predetermined interval (interval of 6 slot pitch) in the circumferential direction of the stator 11 and being in adjacent layers (the 7th layer, the 6th layer) in the radial direction of the stator 11. The element conductors 31, 31 are connected via the second crossover portion 44 on the second end side in the axial direction of the stator 11. Consequently, the 25th to 48th partial coils are connected to the 1st to 24th partial coils in series.

Figure 6A:
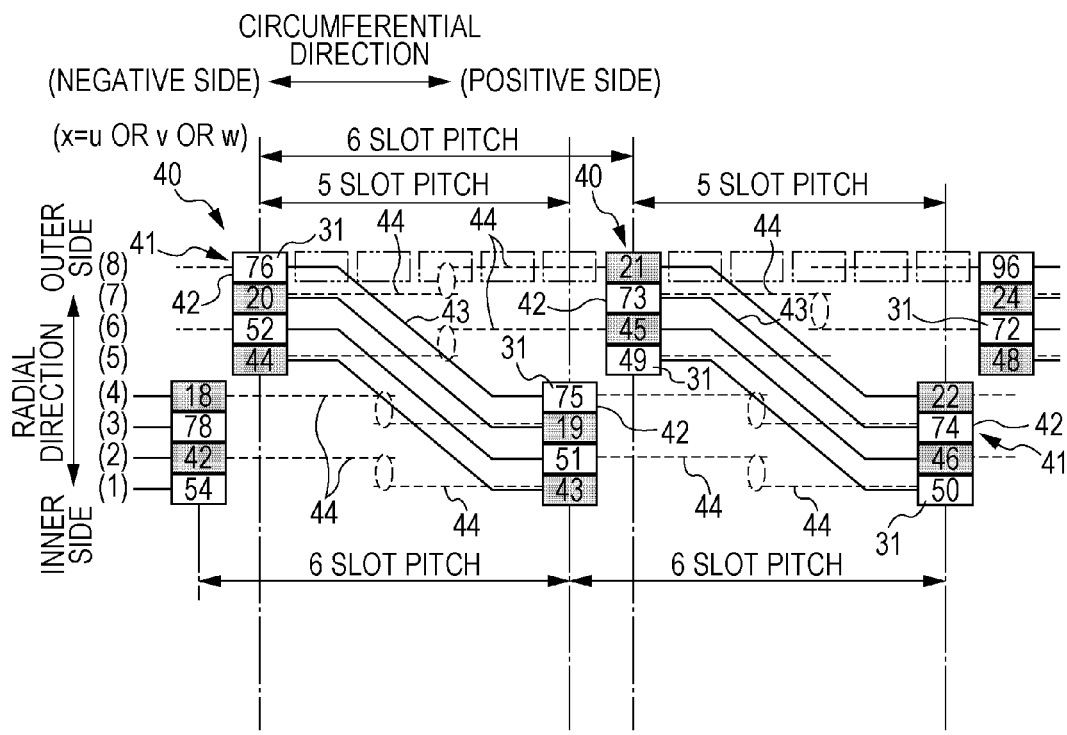
FIGS. 6A and 6B are each a diagram illustrating an arrangement and connection configuration of part of the element conductors included in the coils of each phase in the embodiment.

Next, the 49th to 72nd element conductors 31 included in the 49th to 72nd partial coils of the first coil 21X1 are arranged in the following manner. As illustrated in FIGS. 3 and 4 or FIG. 6A, the (4n+49)th (n=0, 1, . . . , 5) element conductor 31 is located in the 5th layer in a corresponding slot 12. The subsequent (4n+50)th element conductor 31 is located in the 1st layer (the layer arranged radially inward by 4 layers from the (4n+49)th element conductor 31) in the slot 12 which is spaced away by the second predetermined interval (interval of 5 slot pitch) in the positive circumferential direction from the slot 12 in which the (4n+49)th element conductor 31 is arranged. The subsequent (4n+51)th element conductor 31 is located in the 2nd layer (the layer arranged radially outward by 1 layer from the (4n+50)th element conductor 31) in the slot 12 which is spaced away by the first predetermined interval (interval of 6 slot pitch) in the negative circumferential direction from the slot 12 in which the (4n+50)th element conductor 31 is arranged. The subsequent (4n+52)th element conductor 31 is located in the 6th layer (the layer arranged radially outward by 4 layers from the (4n+51)th element conductor 31) in the slot 12 which is spaced away by the second predetermined interval (interval of 5 slot pitch) in the negative circumferential direction from the slot 12 in which the (4n+51)th element conductor 31 is arranged.

In FIG. 6A, the 49th to 52th element conductors 31 are illustrated as one example of (4n+49)th, (4n+50)th, (4n+51)th, (4n+52)th element conductors 31 (where n=0).

In this example, due to the above-described arrangement of the (4n+49)th to (4n+52)th element conductors 31, the slot 12, in which the (4n+51)th element conductor 31 is arranged, is spaced away by an interval of 1 slot pitch (interval of the difference between the first predetermined interval and the second predetermined interval) in the negative circumferential direction from the slot 12 in which the (4n+49)th element conductor 31 is arranged. In addition, the slot 12, in which the (4n+52)th element conductor 31 is arranged, is spaced away by the first predetermined interval (interval of 6 slot pitch) in the negative circumferential direction from the slot 12 in which the (4n+49)th element conductor 31 is arranged.

Figure 8:
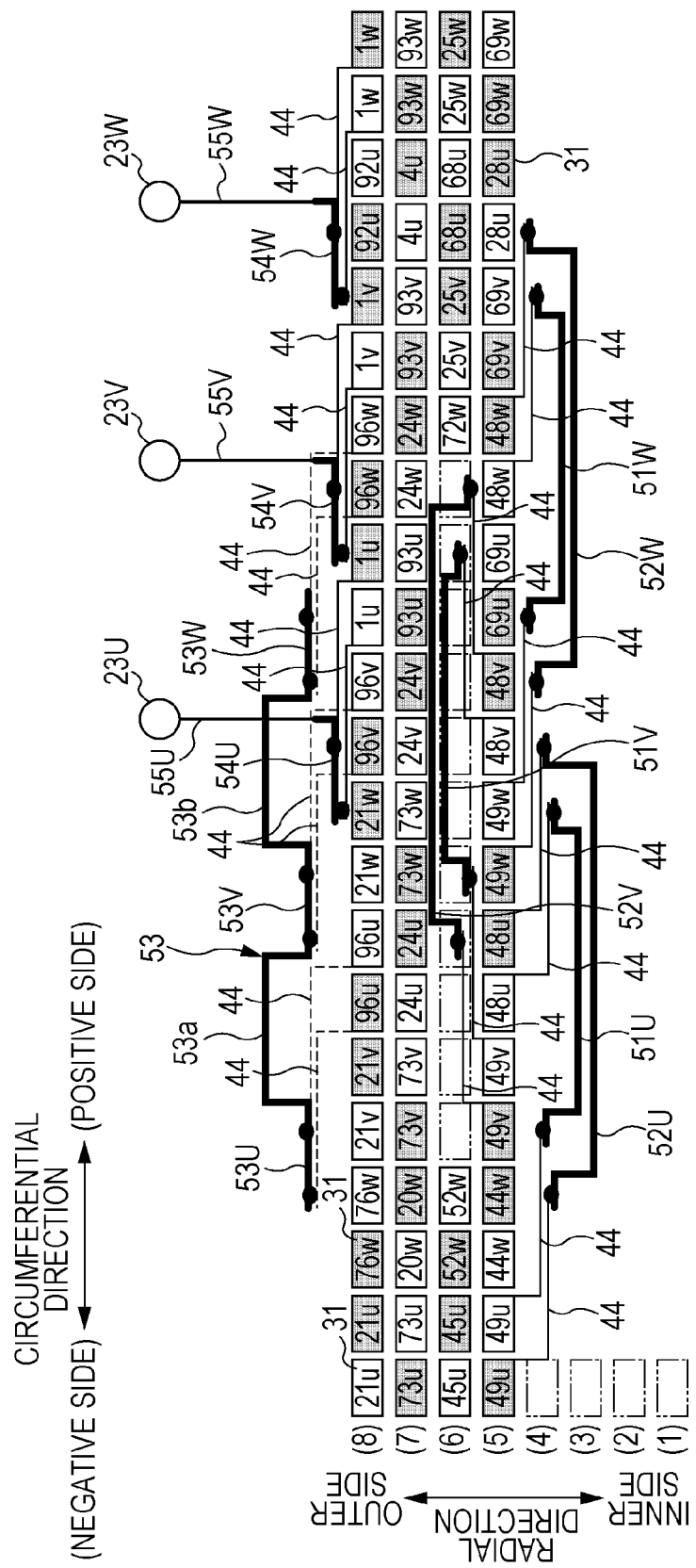
FIG. 8 is a diagram illustrating an arrangement and connection configuration of part of the element conductors included in the coils of each phase in the embodiment.

It should be noted that as seen with reference to FIG. 8, the 49th element conductor 31 of the first coil 21X1 is in the same layer (the 5th layer) as the 48th element conductor 31 indicated as a white box, and is arranged in the slot 12 which is spaced away by an interval of 5 slot pitch (the second predetermined interval) in the negative circumferential direction from the 48th element conductor 31.

Here, the (4n+49)th and (4n+52)th element conductors 31 are the element conductors (the first element conductors) of the first element conductor group, and the (4n+50)th and (4n+51)th element conductors 31 are the element conductors (the second element conductors) of the second element conductor group. Consequently, in the 49th to 72nd partial coils, each of the first element conductors 31 is arranged in the 5th layer or the 6th layer, and each of the second element conductors 31 is arranged in the 1st layer or the 2nd layer.

In the 49th to 72nd element conductors 31, pairs of element conductors 31, 31 (specifically, the pair of the (4n+49)th and (4n+50)th element conductors 31, 31 and the pair of the (4n+51)th and (4n+52)th element conductors 31, 31) having the second predetermined interval (interval of 5 slot pitch) in the circumferential direction of the stator 11 and a predetermined interval (interval of 4 layers) in the radial direction of the stator 11 are each connected via the first crossover portion 43 on the first end side in the axial direction of the stator 11 as a pair of a first element conductor 31 and a second element conductor 31 to be connected (see FIG. 6A).

Also, pairs of element conductors 31, 31 (specifically, the pair of the (4n+50)th and (4n+51)th element conductors 31, 31 and the pair of the (4n'+52)th and (4n'+53)th element conductors 31, 31 (where n'=0, 1, . . . , 4)) having the first predetermined interval (interval of 6 slot pitch) in the circumferential direction of the stator 11 and being in adjacent layers in the radial direction of the stator 11 are each connected via the second crossover portion 44 on the second end side in the axial direction of the stator 11 as a pair of two first element conductors 31, 31 or a pair of two second element conductors 31, 31 to be connected (see FIG. 6A).

In FIG. 6A, similarly to FIG. 5A, the first crossover portion 43 is indicated by a solid line and the second crossover portion 44 is indicated by a dashed line.

Figure 6B:
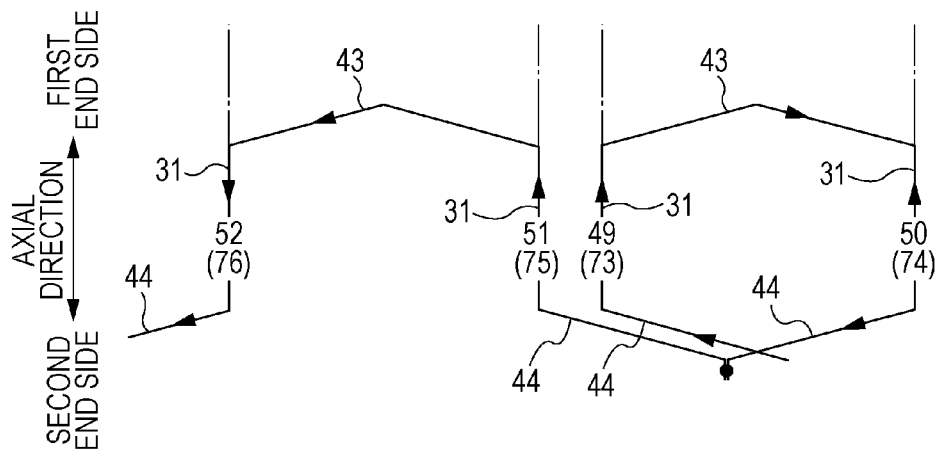

In this manner, the element conductors 31 included in the 49th to 72nd partial coils are connected in series so as to allow electrical conduction sequentially in the pattern as illustrated in FIG. 6B. Thus, the 49th to 72nd partial coils are formed. In this formation, when the set of the 49th to 52nd element conductors 31, 31, 31, 31 connected in series in the above-described manner is defined as one element conductor group, the 49th to 72nd partial coils are formed by continuously connecting 6 sets of the element conductor group at an interval of 12 slot pitch (2×the first predetermined interval) in the negative circumferential direction (the opposite to the direction in the case of the 1st to 48th partial coils) of the stator 11.

Although details will be described later, the 48th element conductor 31 and the 49th element conductor 31 of the first coil 21X1 are connected via a bridge conductor 51X (51U, 51V, or 51W) for each phase on the second end side in the axial direction of the stator 11 as illustrated in FIG. 8. Consequently, the 49th to 72nd partial coils are connected to the 25th to 48th partial coils in series.

Next, the 73rd to 96th element conductors 31 included in the 73rd to 96th partial coils of the first coil 21X1 are arranged in the following manner. As illustrated in FIGS. 3 and 4 or FIG. 6A, the (4n+73)th (n=0, 1, . . . , 5) element conductor 31 is located in the 7th layer in a corresponding slot 12. The subsequent (4n+74)th element conductor 31 is located in the 3rd layer (the layer arranged radially inward by 4 layers from the (4n+73)th element conductor 31) in the slot 12 which is spaced away by the second predetermined interval (interval of 5 slot pitch) in the positive circumferential direction from the slot 12 in which the (4n+73)th element conductor 31 is arranged. The subsequent (4n+75)th element conductor 31 is located in the 4th layer (the layer arranged radially outward by 1 layer from the (4n+74)th element conductor 31) in the slot 12 which is spaced away by the first predetermined interval (interval of 6 slot pitch) in the negative circumferential direction from the slot 12 in which the (4n+74)th element conductor 31 is arranged. The subsequent (4n+76)th element conductor 31 is located in the 8th layer (the layer arranged radially outward by 4 layers from the (4n+75)th element conductor 31) in the slot 12 which is spaced away by the second predetermined interval (interval of 5 slot pitch) in the negative circumferential direction from the slot 12 in which the (4n+75)th element conductor 31 is arranged.

In FIG. 6A, the 73rd to 76th element conductors 31 are illustrated as one example of (4n+73)th, (4n+74)th, (4n+75)th, (4n+76)th element conductors 31 (where n=0).

In this example, the slots 12 in which the (4n+73)th to (4n+76)th element conductors 31 are respectively arranged are the same as the slots 12 in which the (4n+49)th, (4n+50)th, (4n+51)th, (4n+52)th element conductors 31 are respectively arranged.

The (4n+73)th and (4n+76)th element conductors 31 are the element conductors (the first element conductors) of the first element conductor group, and the (4n+74)th and (4n+75)th element conductors 31 are the element conductors (the second element conductors) of the second element conductor group. Consequently, in the 73rd to 96th partial coils, each of the first element conductors 31 is arranged in the 7th layer or the 8th layer, and each of the second element conductors 31 is arranged in the 3rd layer or the 4th layer.

Therefore, the arrangement of the element conductors 31 in the 73rd to 96th partial coils are obtained by shifting the entire arrangement of the element conductors 31 in the 49th to 72nd partial coils radially outward of the stator 11 by 2 layers.

Similarly to the case of the 49th to 72nd partial coils, in the 73rd to 96th element conductors 31, pairs of element conductors 31, 31 (specifically, the pair of the (4n+73)th and (4n+74)th element conductors 31, 31 and the pair of the (4n+75)th and (4n+76)th element conductors 31, 31) having the second predetermined interval (interval of 5 slot pitch) in the circumferential direction of the stator 11 and a predetermined interval (interval of 4 layers) in the radial direction of the stator 11 are each connected via the first crossover portion 43 on the first end side in the axial direction of the stator 11 as a pair of a first element conductor 31 and a second element conductor 31 to be connected (see FIG. 6A).

Also, pairs of element conductors 31, 31 (specifically, the pair of the (4n+74)th and (4n+75)th element conductors 31, 31 and the pair of the (4n'+76)th and (4n'+77)th element conductors 31, 31 (where n°=0, 1, . . . , 4)) having the first predetermined interval (interval of 6 slot pitch) in the circumferential direction of the stator 11 and being in adjacent layers in the radial direction of the stator 11 are each connected via the second crossover portion 44 on the second end side in the axial direction of the stator 11 as a pair of two first element conductors 31, 31 or a pair of two second element conductors 31, 31 to be connected (see FIG. 6A).

In this manner, the element conductors 31 included in the 73rd to 96th partial coils are connected in series so as to allow electrical conduction sequentially in the same pattern as the case of the 49th to 72nd partial coils illustrated in FIG. 6B. Thus, the 73rd to 96th partial coils are formed.

In this formation, when the set of the 73rd to 76th element conductors 31, 31, 31, 31 connected in series in the above-described manner is defined as one element conductor group, the 73rd to 96th partial coils are formed by continuously connecting 6 sets of the element conductor group at an interval of 12 slot pitch (2×the first predetermined interval) in the negative circumferential direction of the stator 11.

Figure 7B:
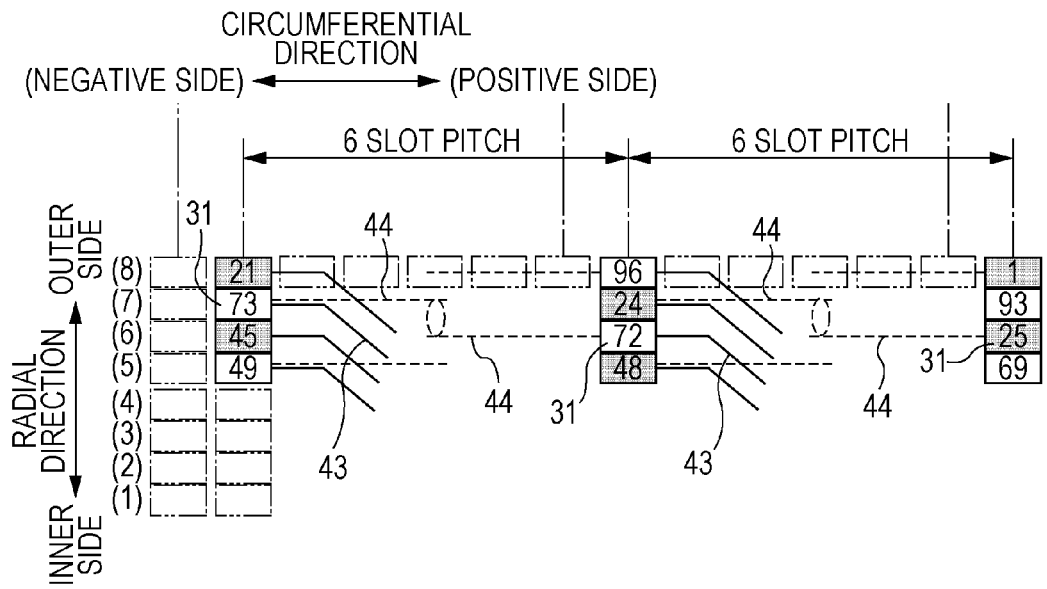

It should be noted that as illustrated in FIG. 7B, the 72nd element conductor 31 in the 49th to 72nd partial coils and the 73rd element conductor 31 in the 73rd to 96th partial coils are arranged in the slots 12, 12 having the first predetermined interval (interval of 6 slot pitch) in the circumferential direction of the stator 11 and being in adjacent layers (the 6th layer, the 7th layer) in the radial direction of the stator 11. The element conductors 31, 31 are connected via the second crossover portion 44 on the second end side in the axial direction of the stator 11. Consequently, the 73rd to 96th partial coils are connected to the 49th to 72nd partial coils in series.

What has been described is the entire arrangement and connection configuration of the element conductors 31 included in the first coil 21X1 of each phase.

The first coils 21U1, 21V1, 21W1 of U phase, V phase, and W phase, respectively, are arranged as follows. That is, as seen with reference to FIGS. 3 and 4, the kth (k=1, 2, . . . , 96) element conductor 31 of the first coil 21V1 of V phase is arranged in the slot 12 which is spaced away by an interval of 4 slot pitch in the positive circumferential direction of the stator 11 from the slot 12 in which the kth element conductor 31 of the first coil 21U1 of U phase is arranged.

Similarly, the kth (k=1, 2, . . . , 96) element conductor 31 of the first coil 21W1 of W phase is arranged in the slot 12 which is spaced away by an interval of 4 slot pitch in the positive circumferential direction of the stator 11 from the slot 12 in which the kth element conductor 31 of the first coil 21V1 of V phase is arranged.

Consequently, the first coils 21U1, 21V1, 21W1 of U phase, V phase, and W phase, respectively, are arranged to be sequentially shifted by an interval of 4 slot pitch in the circumferential direction of the stator 11.

Next, the second coil 21X2 of any phase will be described. Similarly to case of the first coil 21X1, the second coil 21X2 of any phase is formed by connecting the 1st to 24th, the 25th to 48th, the 49th to 72nd, and the 73rd to 96th partial coils in series, the 1st to 24th partial coils being formed by connecting 1st to 24th element conductors 31 in series, the 25th to 48th partial coils being formed by connecting 25th to 48th element conductors 31 in series, the 49th to 72nd partial coils being formed by connecting 49th to 72nd element conductors 31 in series, the 73rd to 96th partial coils being formed by connecting 73rd to 96th element conductors 31 in series.

Similarly to case of the first coil 21X1, the arrangement and connection configuration of the element conductors 31 of the second coil 21X2 are mainly divided into the configuration of the 1st to 24th partial coils, the configuration of the 25th to 48th partial coils, the configuration of the 49th to 72nd partial coils, and the configuration of the 73rd to 96th partial coils.

In addition, similarly to the case of the first coil 21X1, the element conductors 31 (24 element conductors 31) included in the above-mentioned each partial coils of the second coil 21X2 includes the first element conductor group and the second element conductor group, the first element conductor group including a plurality of element conductors 31 (the first element conductors) which are respectively inserted in a plurality of slots 12 arranged in the circumferential direction of the stator 11 at a pitch (6 slot pitch) of the first predetermined interval, the second element conductor group including the plurality of element conductors 31 (the second element conductors) which are respectively inserted in a plurality of slots 12 arranged in the circumferential direction of the stator 11 at the pitch (6 slot pitch) of the first predetermined interval with a phase shifted in the circumferential direction of the stator 11 with respect to the slots 12 in which the element conductors 31 of the first element conductor group are inserted.

In this configuration, the 1st to 48th element conductors 31 (the element conductors 31 included in the 1st to 24th partial coils and the 25th to 48th partial coils) of the second coil 21X2, and the 49th to 96th element conductors 31 (the element conductors 31 included in the 49th to 72nd partial coils and the 73rd to 96th partial coils) of the second coil 21X2 have the same arrangement and connection configuration as that of the first coil 21X1.

Therefore, also in the second coil 21X2, the slots 12 (the second slot) in which the element conductors 31 of the second element conductor group included in each partial coils are inserted, are shifted in phase in the positive circumferential direction of the stator 11 by the second predetermined interval (an interval of 5 slot pitch) with respect to the slots 12 (the first slot) in which the element conductors 31 of the first element conductor group are inserted, the second predetermined interval being smaller than the first predetermined interval.

In each of the 1st to 24th partial coils, the 25th to 48th partial coils, the 49th to 72nd partial coils, and the 73rd to 96th partial coils of the second coil 21X2, similarly to the case of the first coil 21X1, the first element conductors 31 are each arranged in a layer (one of the 5th to 8th layers) on the radially outer side of the stator 11. Also, similarly to the case of the first coil 21X1, the second element conductors 31 are each arranged in a layer (one of the 1st to 4th layers) on the radially inner side of the stator 11.

However, in the second coil 21X2, the interval (interval in the circumferential direction of the stator 11) between the 48th and 49th element conductors 31, 31 is different from the interval in the first coil 21X1.

Specifically, as seen with reference to FIGS. 3 and 4, the 1st to 48th element conductors 31 of the second coil 21X2 are arranged in the slots to which the 1st to 48th element conductors 31 of the first coil 21X1 in phase with the second coil 21X2 are respectively adjacent in the positive circumferential direction to the slots 12.

That is, the entire 1st to 48th element conductors 31 (the element conductors 31 included in the 1st to 24th partial coils and the 25th to 48th partial coils) of the second coil 21X2 are arranged in the positions in which the entire 1st to 48th element conductors 31 of the first coil 21X1 are shifted by an interval of 1 slot pitch in the positive circumferential direction.

On the other hand, the 49th to 96th element conductors 31 of the second coil 21X2 are arranged in the slots respectively adjacent to the slots in which the 49th to 96th element conductors 31 of the first coil 21X1 are arranged.

That is, the entire 49th to 96th element conductors 31 (the element conductors 31 included in the 49th to 72nd partial coils and the 73rd to 96th partial coils) of the second coil 21X2 are arranged in the positions in which the entire 49th to 96th element conductors 31 of the first coil 21X1 are shifted by an interval of 1 slot pitch in the negative circumferential direction.

Therefore, as seen with reference to FIG. 8, the interval (interval in the circumferential direction of the stator 11) between the 48th and 49th element conductors 31, 31 provides an interval of 5 slot pitch in the first coil 21X1, whereas the interval provides an interval of 7 slot pitch in the second coil 21X2.

Although details will be described later, the 48th and 49th element conductors 31, 31 of the second coil 21X2 are connected via a bridge conductor 52X (52U, 52V, or 52W) for each phase on the second end side in the axial direction of the stator 11 as illustrated in FIG. 8.

The arrangement and connection configuration of the element conductors 31 of the second coil 21X2 are the same as those of the first coil 21X1 except for what has been described above. Also, the inter arrangement configuration of the second coils 21U2, 21V2, 21W2 of U phase, V phase, and W phase is the same as the inter arrangement configuration of the first coils 21U1, 21V1, 21W1.

Hereinafter, the connection structure (structure of the first crossover portion 43 and the second crossover portion 44) between the element conductors 31, 31 in each of the first coil 21X1 and the second coil 21X2 of any phase will be described more specifically.

Figure 9A:
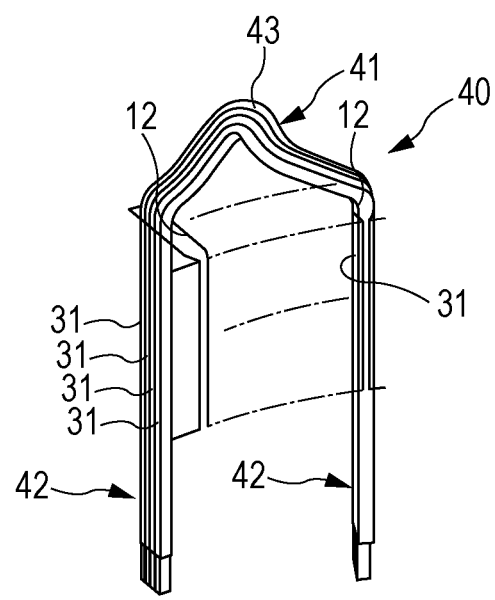
FIG. 9A is a perspective view of a segment conductor that forms a pair of a first element conductor and a second element conductor in the embodiment.
Figure 9B:
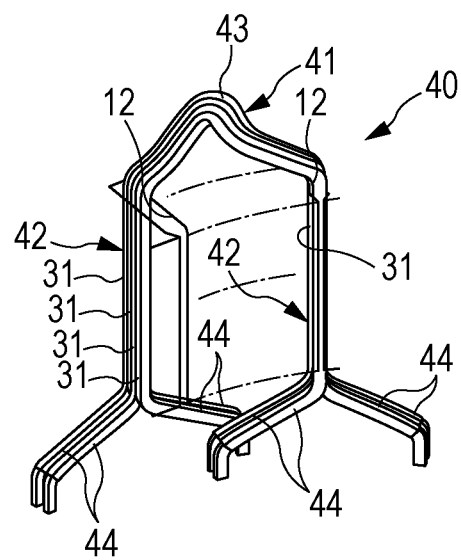
FIG. 9B is a perspective view of the segment conductor in which the end portions of the legs of the segment conductor are bent.

In the present embodiment, each element conductor 31 is formed as part of a segment conductor 40 illustrated in FIGS. 9A and 9B. The segment conductor 40 is a bundle of four bifurcated conductor members 41 that each form a pair of element conductors 31, 31 (a pair of the first element conductor 31 and the second element conductor 31) to be connected via the first crossover portion 43.

The segment conductor 40 is produced by forming a bundle of conductor wires into a bifurcated shape (substantially U-shape) as illustrated in FIG. 9A, the bundle of conductor wires being four mutually insulated conductor wires aligned in a row in a transverse direction. Each of the four wires in a bifurcated shape included in the segment conductor 40 is a bifurcated conductor member 41.

Each bifurcated conductor member 41 of the segment conductor 40, formed in a bifurcated shape has a structure integrally including two legs 42, 42 to be inserted in different slots 12, 12 of the stator 11, and the first crossover portion 43 serving as a linking portion between the base ends of the legs 42, 42.

A leg 42 on one side of the two legs 42, 42 of each bifurcated conductor member 41 is a leg for forming the first element conductor 31 (hereinafter may be referred to as a first element conductor formation leg 42). Also, a leg 42 on the other side of the two legs 42, 42 of each bifurcated conductor member 41 is a leg (hereinafter may be referred to as a second element conductor formation leg 42) for forming a second element conductor 31 to be connected to a first element conductor 31 which is formed by the leg 42 on the one side.

In this configuration, the segment conductors 40 are formed such that the two legs 42, 42 of each bifurcated conductor member 41 extend in the axial direction of the stator 11 with predetermined intervals in the circumferential direction and the radial direction of the stator 11, respectively. As illustrated in FIGS. 5A and 6A, the interval between the legs 42, 42 in the circumferential direction of the stator 11 is the second predetermined interval (interval of 5 slot pitch).

The interval between the legs 42, 42 in the radial direction of the stator 11 is an interval for four layers as illustrated in FIGS. 5A and 6A.

A bundle of the first element conductor formation legs 42 and a bundle of the second element conductor formation legs 42 of each segment conductor 40 are inserted in two slots 12, 12 from the first end side in the axial direction of the stator 11, the two slots having the second predetermined interval (interval of 5 slot pitch) in the circumferential direction of the stator 11, and the bundle of the 5th to 8th layers of first element conductor 31 are thereby formed due to the bundle of first element conductor formation legs 42 in one slot 12 of the two slots 12, 12. In addition, the bundle of the 1st to 4th layers of second element conductor 31 is formed due to the bundle of second element conductor formation legs 42 in the other slot 12 (the slot 12 being spaced away by the second predetermined interval in the positive circumferential direction from the one slot 12) of the two slots 12, 12.

On the first end side in the axial direction of the stator 11, the 1st to 4th layers of element conductor 31 are respectively connected via the first crossover portions 43 to the 5th to 8th layers of element conductor 31 having an interval for four layers in the radial direction of the stator 11.

In this configuration, the arrangement order (the arrangement order in the radial direction of the stator 11) of the 5th to 8th layers of first element conductor 31 is the same as the arrangement order (the arrangement order in the radial direction of the stator 11) of the 1st to 4th layers of second element conductor 31 to be respectively connected to the 5th to 8th layers of first element conductor 31. Consequently, the four bifurcated conductor members 41 of the segment conductor 40 including the respective first crossover portions 43 are aligned in the radial direction of the stator 11.

In this manner, each bifurcated conductor member 41 of the segment conductor 40 forms a pair of a first element conductor 31 and a second element conductor 31 by the two legs 42, 42, the first element conductor 31 being arranged in one of four layers (the 5th layer to the 8th layer) on the radially outer side of the stator 11 in one slot 12, the second element conductor 31 being arranged in one of four layers (the 1st layer to the 4th layer) on the radially inner side of the stator 11 in the other slot 12 which is spaced away by an interval of 5 slot pitch in the positive circumferential direction of the stator 11 from the one slot 12.

In addition, each bifurcated conductor member 41 forms the first crossover portion 43 that connects a pair of the first element conductor 31 and the second element conductor 31 on the first end side in the axial direction of the stator 11.

In each slot 12 of the stator 11, the bundle of first element conductor formation legs 42 of one of two segment conductors 40 is inserted at the position of the 5th to 8th layers, and the bundle of second element conductor formation legs 42 of the other of the two segment conductors 40 is inserted at the position of the 1st to 4th layers. In this manner, the 1st to 8th layers of element conductor 31 in each slot 12 are formed.

As described above, the bundle of first element conductor formation legs 42 and the bundle of second element conductor formation legs 42 of the four bifurcated conductor members 41 included in the segment conductor 40 are inserted in the slot 12, thereby simultaneously achieving arrangement of the 1st to 96th element conductors 31 of each of the first coil 21X1 and the second coil 21X2 of any phase in the slot 12 in the pattern as illustrated in FIGS. 3 and 4, and also connection of the pair of the first element conductor 31 and the second element conductor 31 to be connected on the first end side in the axial direction of the stator 11 as illustrated in FIGS. 5A and 6A.

The end portion of each leg 42, which is inserted in the slot 12 from the first end side in the axial direction, of the segment conductor 40 is protruding through the slot 12 to the second end side in the axial direction as illustrated in FIG. 9A. The end portions of four legs 42 of each segment conductor 40 are then separated from each other and bent in the circumferential direction of the stator 11 as illustrated in FIG. 9B, the end portions protruding through the slot 12 to the second end side in the axial direction. This bending forms the second crossover portion 44 which allows each element conductor 31 of the slot 12 to be connected to another element conductor 31 on the second end side in the axial direction of the stator 11.

In this formation, as illustrated in FIGS. 5A and 6A, the second crossover portions 44 respectively contiguous to the 2nd, 4th, 5th, and 7th layers of element conductor 31 are bent in the positive circumferential direction. Also, the second crossover portions 44 respectively contiguous to the 1st, 3rd, 6th, and 8th layers of element conductor 31 are bent in the negative circumferential direction. Consequently, the second crossover portions 44 respectively contiguous to the 2nd, 4th, 5th, and 7th layers of element conductor 31 and the second crossover portions 44 respectively contiguous to the 1st, 3rd, 6th, and 8th layers of element conductor 31 are bent so as to be closer to each other in the circumferential direction of the stator 11.

It should be noted that the second crossover portion 44 contiguous to an element conductor 31 has approximately half the length of 6 slot pitch (the second predetermined interval) in the circumferential direction of the stator 11. As illustrated in FIG. 9B, the end portion of each second crossover portion 44 is bent so as to stand upright in the axial direction of the stator 11.

In order to allow electrical conduction in the 1st to 96th element conductors 31 of each of the first coil 21X1 and the second coil 21X2 of any phase in the order of connection illustrated in FIGS. 3 and 4, the end portions of second crossover portions 44 are directly connected to each other or connected via bridge conductors 51X, 52X described below, the second crossover portions 44 being respectively contiguous to a pair of the first element conductors 31, 31 or a pair of the second element conductors 31, 31 which are adjacent in the connection order.

More particularly, in each of the first coil 21X1 and the second coil 21X2 of any phase, the pairs of element conductors 31, 31 to be connected on the second end side in the axial direction of the stator 11 are a pair of the (4na+2)th and (4na+3)th (where na=0, 1, . . . , 23) second element conductors 31, 31, and a pair of the (4nb+4)th and (4nb+5)th (where nb=0, 1, . . . , 22) first element conductors 31, 31.

It should be noted that the leg 42 of a bifurcated conductor member 41 forming one of a pair of the (4na+2)th and (4na+3)th second element conductors 31, 31, and the leg 42 of a bifurcated conductor member 41 forming the other of the pair respectively correspond to the leg A2a and A2b in the present disclosure.

Also, the leg 42 of a bifurcated conductor member 41 forming one of a pair of the (4nb+4)th and (4nb+5)th first element conductors 31, 31, and the leg 42 of a bifurcated conductor member 41 forming the other of the pair respectively correspond to the leg A1a and A1b in the present disclosure.

Out of these pairs of element conductors 31, 31 (pairs of the first element conductors 31, 31 and pairs of the second element conductors 31, 31), in each of the pairs of element conductors 31, 31 except a pair of the 48th and 49th element conductors 31, 31, the positions (layers) of the element conductors 31, 31 are shifted by one layer in the radial direction of the stator 11 as in the pattern illustrated in FIGS. 3 and 4 (for example, see a pair of the 2nd and 3rd element conductors 31, 31, a pair of the 28th and 29th element conductors 31, 31 each indicated as a white box in FIG. 5A, and a pair of the 70th and 71st element conductors 31, 31 each indicated as a gray box in FIG. 5A).

The end portions of the second crossover portions 44 respectively contiguous to such a pair of element conductors 31, 31 are closely positioned so as to face each other in the radial direction of the stator 11.

Consequently, in the present embodiment, in the pairs of element conductors 31, 31 except a pair of the 48th and 49th element conductors 31, 31 out of the pairs of element conductors 31, 31 to be connected on the second end side in the axial direction of the stator 11, the end portions of the second crossover portions 44 respectively contiguous to such a pair of element conductors 31, 31 are directly connected. The connection is made, for example, by welding.

In this case, the connection can be made easily because the end portions of the second crossover portions 44 respectively contiguous to the pair of element conductors 31, 31 are closely positioned.

In this manner, the second crossover portion 44 is formed as a member for connecting each pair of the first element conductors 31, 31 to be connected and each pair of the second element conductors 31, 31 to be connected on the second end side in the axial direction of the stator 11 in such a manner that the end portions of the legs 42, 42 forming the pair of element conductors 31, 31 are bent to be closer to each other in the circumferential direction of the stator 11.

As supplemental remarks, in the 1st to 24th partial coils in each of the first coil 21X1 and the second coil 21X2 of any phase, as illustrated in FIGS. 5A and 6A, a pair of the 3rd and 4th layers of second element conductors 31, 31 adjacent in the connection order, and a pair of the 7th and 8th layers of first element conductors 31, 31 adjacent in the connection order are connected via the respective second crossover portions 44 on the second end side in the axial direction of the stator 11 as described above.

Also, in the 25th to 48th partial coils, as illustrated in FIGS. 5A and 6A, a pair of the 1st and 2nd layers of second element conductors 31, 31 adjacent in the connection order, and a pair of the 5th and 6th layers of first element conductors 31, 31 adjacent in the connection order are connected via the respective second crossover portions 44 on the second end side in the axial direction of the stator 11 as described above.

As illustrated in FIG. 7A, although a pair of the 24th and 25th element conductors 31, 31 are connected via a second crossover portion 44 on the second end side in the axial direction of the stator 11 as described above, the above-mentioned pair of the element conductors 31, 31 is a pair of first element conductors in the 6th and 7th layers.

Thus, a set of layers of element conductors 31, 31 to be connected in the 1st to 24th partial coils on the second end side in the axial direction of the stator 11, and a set of layers of element conductors 31, 31 to be connected in the 25th to 48th partial coils on the second end side in the axial direction of the stator 11 are switched over after the connection of the 24th and 25th element conductors 31, 31.

Also, in the 49th to 72nd partial coils in each of the first coil 21X1 and the second coil 21X2 of any phase, as illustrated in FIGS. 5A and 6A, a pair of the 1st and 2nd layers of second element conductors 31, 31 adjacent in the connection order, and a pair of the 5th and 6th layers of first element conductors 31, 31 adjacent in the connection order are connected via the respective second crossover portions 44 on the second end side in the axial direction of the stator 11 as described above.

In the 73rd to 96th partial coils, as illustrated in FIGS. 5A and 6A, a pair of the 3rd and 4th layers of second element conductors 31, 31 adjacent in the connection order, and a pair of the 7th and 8th layers of first element conductors 31, 31 adjacent in the connection order are connected via the respective second crossover portions 44 on the second end side in the axial direction of the stator 11 as described above.

As illustrated in FIG. 7B, although a pair of the 72nd and 73rd element conductors 31, 31 are connected via a second crossover portion 44 on the second end side in the axial direction of the stator 11 as described above, the above-mentioned pair of the element conductors 31, 31 is a pair of first element conductors in the 6th and 7th layers.

Thus, a set of layers of element conductors 31, 31 to be connected in the 49th to 72nd partial coils on the second end side in the axial direction of the stator 11, and a set of layers of element conductors 31, 31 to be connected in the 73rd to 96th partial coils on the second end side in the axial direction of the stator 11 are switched over after the connection of the 72nd and 73rd element conductors 31, 31.

Next, a configuration will be described in which a pair of the 48th and 49th element conductors 31, 31 is connected on the second end side in the axial direction of the stator 11 in each of the first coil 21X1 and the second coil 21X2 of any phase.

A pair of the 48th and 49th element conductors 31, 31 is a pair of the first element conductors arranged in the 5th layer in each of the first coil 21X1 and the second coil 21X2. As described above, a pair of the 48th and 49th element conductors 31, 31 is arranged in slots 12, 12 having an interval of 5 slot pitch in the circumferential direction of the stator 11 in the first coil 21X1, and in slots 12, 12 having an interval of 7 slot pitch in the circumferential direction of the stator 11 in the second coil 21X2.

Also, as a consequence of the above-described bending (bending in the circumferential direction of the stator 11) of the second crossover portions 44 of the bifurcated conductor members 41 of each segment conductor 40, the second crossover portions 44, 44 respectively contiguous to the 48th and 49th element conductors 31, 31 are bent in the positive circumferential direction as illustrated in FIG. 8.

In FIG. 8, for convenience of illustration, the second crossover portions 44, 44 respectively contiguous to the 48th and 49th element conductors 31, 31 are illustrated with displacement from the actual position in the radial direction of the stator 11. The second crossover portions 44, 44 are actually arranged in the position of the same layer (the 5th layer) as the layer of the 48th and 49th element conductors 31, 31 in the radial direction of the stator 11.

Therefore, the end portions of the second crossover portions 44, 44 respectively contiguous to the 48th and 49th element conductors 31, 31 have an interval of approximately 5 slot pitch in the circumferential direction of the stator 11 in the first coil 21X1, and have an interval of approximately 7 slot pitch in the circumferential direction of the stator 11 in the second coil 21X2.

Also, the end portions of the second crossover portions 44, 44 respectively contiguous to the 48th and 49th element conductors 31, 31 in the first coil 21X1 and the second coil 21X2 of any phase are aligned in the order as illustrated in FIG. 8 in the circumferential direction of the stator 11.

Specifically, the following pairs of the end portions of the second crossover portions 44, 44 are aligned sequentially from the negative circumferential side to the positive circumferential side: the pair of the end portions of the second crossover portions 44, 44 respectively contiguous to the 49th element conductors 31, 31 of the first coil 21X1 and the second coil 21X2 of U phase; the pair of the end portions of the second crossover portions 44, 44 respectively contiguous to the 49th element conductors 31, 31 of the first coil 21X1 and the second coil 21X2 of V phase; the pair of the end portions of the second crossover portions 44, 44 respectively contiguous to the 48th element conductors 31, 31 of the first coil 21X1 and the second coil 21X2 of U phase; the pair of the end portions of the second crossover portions 44, 44 respectively contiguous to the 49th element conductors 31, 31 of the first coil 21X1 and the second coil 21X2 of W phase; the pair of the end portions of the second crossover portions 44, 44 respectively contiguous to the 48th element conductors 31, 31 of the first coil 21X1 and the second coil 21X2 of V phase; and the pair of the end portions of the second crossover portions 44, 44 respectively contiguous to the 48th element conductors 31, 31 of the first coil 21X1 and the second coil 21X2 of W phase.

Thus, in the present embodiment, in the first coil 21X1 of any phase, the second crossover portions 44, 44 respectively contiguous to the 48th and 49th element conductors 31, 31 are connected via a bridge conductor 51X (51U, 51V, 51W). Similarly, in the second coil 21X2, the second crossover portions 44, 44 respectively contiguous to the 48th and 49th element conductors 31, 31 are connected via a bridge conductor 52X (52U, 52V, 52W).

In this configuration, the bridge conductors 51X, 52X in each phase is formed in a projecting shape (specifically, a rectangularly projecting shape) so as to protrude in the radial direction of the stator 11 between the end portion of the second crossover portion 44 contiguous to the 48th element conductor 31 and the end portion of the second crossover portion 44 contiguous to the 49th element conductor 31.

Also, in order to allow the bridge conductor 51X of the first coil 21X1 to be located inward of the bridge conductor 52X of the second coil 21X2 for each phase, the width of the bridge conductor 51X in the radial direction of the stator 11 is set to be smaller than the width of the bridge conductor 52X, and the length of the bridge conductor 51X in the circumferential direction of the stator 11 is set to be smaller than the length of the bridge conductor 52X.

It should be noted that the length of the bridge conductor 51X in the circumferential direction of the stator 11 is approximately the same as the interval (interval of 5 slot pitch) between the 48th and 49th element conductors 31, 31 of the first coil 21X1. Also, the length of the bridge conductor 52X in the circumferential direction of the stator 11 is approximately the same as the interval (interval of 7 slot pitch) between the 48th and 49th element conductors 31, 31 of the second coil 21X2.

In the subsequent description, the width of the bridge conductors 51X, 52X in the radial direction of the stator 11 is referred to as a projection height, and the length of the bridge conductors 51X, 52X in the circumferential direction of the stator 11 is referred to as a circumferential length.

For each phase, both ends of the bridge conductor 51X are connected by welding to the corresponding end portions of the second crossover portions 44, 44 respectively contiguous to the 48th and 49th element conductors 31, 31 in the first coil 21X1. Similarly, both ends of the bridge conductor 52X are connected by welding to the corresponding end portions of the second crossover portions 44, 44 respectively contiguous to the 48th and 49th element conductors 31, 31 in the second coil 21X2.

Figure 11:
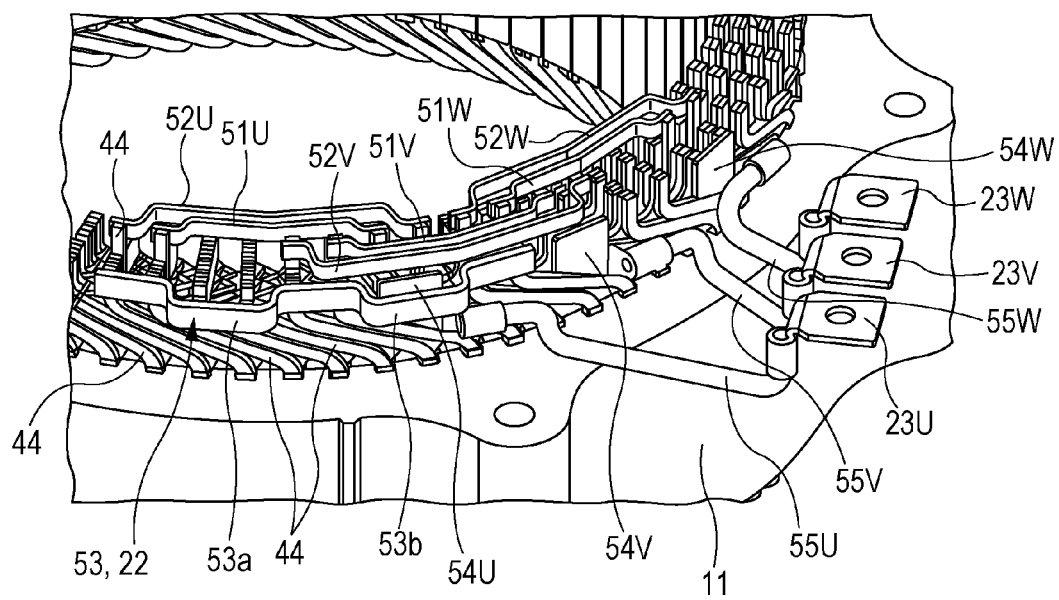
FIG. 11 is a perspective view of a structure of the one end side of the stator with coils mounted of the rotary electric machine according to the embodiment.

In this configuration, in the present embodiment, the respective end portions of the second crossover portions 44, 44 respectively contiguous to the 48th and 49th element conductors 31, 31 are formed so as to protrude in the axial direction of the stator 11 (height in the axial direction is increased) by a length from the end portion of a second crossover portion 44 contiguous to another element conductor 31, the length being approximately the same as the width (thickness) of the bridge conductors 51X, 52X in the axial direction of the stator 11 (see FIG. 11). It should be noted that the width (thickness) of the bridge conductors 51X, 52X in the axial direction of the stator 11 includes the thickness of an insulating member (such as insulating coating) provided on the periphery of the bridge conductors 51X, 52X.

For this reason, it is possible to easily weld each end of the bridge conductors 51X, 52X to the end portions of the 48th or 49th element conductor 31 by an operation in the radial direction of the stator 11.

In addition, in order to avoid interference between the bridge conductors 51X, 52X for one phase and the bridge conductors 51X, 52X of the other phase, the bridge conductors 51X, 52X for the phases are formed such that out of the bridge conductors 51U, 52U of U phase, the bridge conductors 51V, 52V of V phase, and the bridge conductors 51W, 52W of W phase, the bridge conductors for two phases located on both sides in the circumferential direction of the stator 11 and the bridge conductor located between the bridge conductors for the two phases are made to project in opposite directions to each other in the radial direction of the stator 11 (oppositely protruding in the radial direction).

Specifically, in the present embodiment, out of the bridge conductors 51U, 52U of U phase, the bridge conductors 51V, 52V of V phase, and the bridge conductors 51W, 52W of W phase, the bridge conductors for two phases located on both sides in the circumferential direction of the stator 11 are the bridge conductors 51U, 52U of U phase and the bridge conductors 51W, 52W of W phase. In this case, the end of the longer bridge conductor 52U of U phase in the positive circumferential direction, and the end of the longer bridge conductor 52W of W phase in the negative circumferential direction have an interval of approximately 1 slot pitch.

The bridge conductors 51U, 52U of U phase and the bridge conductors 51W, 52W of W phase are formed so as to project (protrude) radially inward of the stator 11.

Also, the circumferential central portion of the bridge conductors 51V, 52V of V phase is located in the middle of the bridge conductors 51U, 52U of U phase and the bridge conductors 51W, 52W of W phase.

The bridge conductors 51V, 52V of V phase are formed so as to project radially outward of the stator 11, that is, to project (protrude) in the opposite direction to the bridge conductors 51U, 52U of U phase and the bridge conductors 51W, 52W of W phase.

It should be noted that the projection height of the radially inward projecting bridge conductors 51U, 52U of U phase and bridge conductors 51W, 52W of W phase is set to such a height that assures the bridge conductors 51U, 52U, 51W, 52W are not protruding inwardly from the inner circumferential surface of the stator 11.

In addition, the projection height of the radially outward projecting bridge conductors 51V, 52V of V phase is set to such a height that assures the bridge conductors 51V, 52V are not protruding outwardly from the outer circumferential surface of the stator 11.

Figure 10:
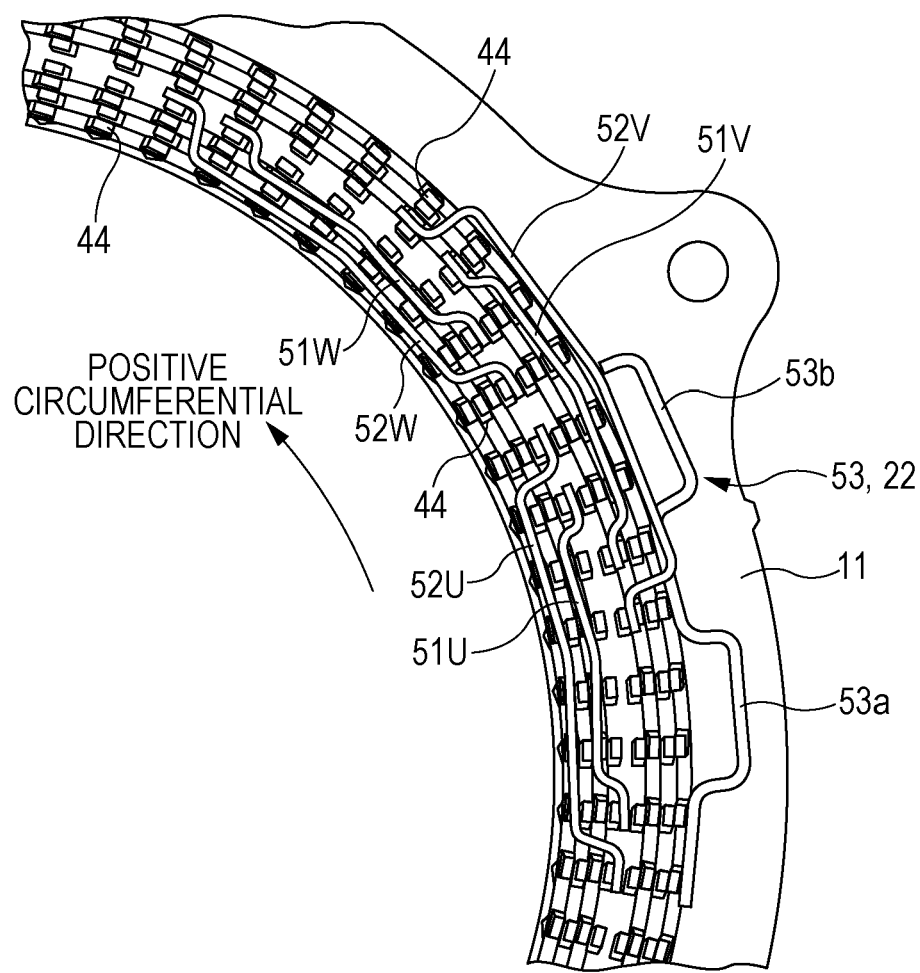
FIG. 10 is a view of bridge conductors and neutral point forming conductors arranged on one end side of the stator of the rotary electric machine according to the embodiment, the view being taken in an axial direction of the stator.

FIG. 10 is a view of part of the end of the stator 11 on the second end side in the axial direction, the stator 11 being provided with the first coil 21X1 and the second coil 21X2 of each phase, the view being taken in the axial direction of the stator 11. FIG. 11 is a perspective view of the part of the end of the stator 11 on the second end side in the axial direction.

The above-described arrangement and formation of the bridge conductors 51U, 52U of U phase, the bridge conductors 51V, 52V of V phase, and the bridge conductors 51W, 52W of W phase can prevent mutual interference between the bridge conductors 51U, 52U, 51V, 52V, 51W, 52W as seen in FIGS. 10 and 11.

In addition, even when the interval between the inner circumferential surface and the outer circumferential surface of the stator 11 is relatively small for the bridge conductors 51U, 52U, 51V, 52V, 51W, 52W, the bridge conductors are prevented from protruding inwardly from the inner circumferential surface and outwardly from the outer circumferential surface of the stator 11, and thus the bridge conductors are arranged within the interval between the inner circumferential surface and the outer circumferential surface.

Also, the bridge conductors 51U, 52U, 51V, 52V, 51W, 52W are densely arranged to be close to each other on the second end side of the stator 11, thereby making it possible to efficiently execute connection work between the bridge conductors and the second crossover portions 44 by welding or the like.

The height positions of the bridge conductors 51U, 52U, 51V, 52V, 51W, 52W in the axial direction of the stator 11 are the same for each bridge conductor. Moreover, the height position of the bridge conductors is sufficiently close to the end face of the stator 11 on the second end side in the axial direction because the height position is at a position which is higher than the second crossover portions 44 by the thickness of the bridge conductors, the second crossover portions 44 connecting the pairs of element conductors 31, 31 except the 48th and 49th element conductors 31, 31.

Consequently, the axial length of the rotary electric machine including the coil 21X of each phase can be kept at a minimum necessary length, and thus miniaturization of the rotary electric machine can be achieved.

In the present embodiment, the bridge conductors 51U, 52U of U phase and the bridge conductors 51W, 52W of W phase are each formed so as to project (protrude) radially inward of the stator 11, and the bridge conductors 51V, 52V of V phase are formed so as to project (protrude) radially outward of the stator 11. However, the bridge conductors 51U, 52U of U phase and the bridge conductors 51W, 52W of W phase may be formed so as to project radially outward of the stator 11, and the bridge conductors 51V, 52V of V phase may be formed so as to project radially inward of the stator 11.

The element conductors 31 formed in the above manner on one end side of each of the first coil 21X1 and the second coil 21X2 of any phase of U phase, V phase, and W phase are connected to the neutral point 22 in common with the three phases on the second end side in the axial direction of the stator 11 as described below. The element conductors 31 on the other end side of each of the first coil 21X1 and the second coil 21X2 of any phase are connected to the current I/O terminals 23X of the phase on the second end side in the axial direction of the stator 11 as described below.

In the present embodiment, the element conductor 31 connected to the neutral point 22 is the 96th element conductor 31 in any of the first coil 21X1 and the second coil 21X2 of each phase. The neutral point 22 is constituted by a neutral point forming conductor 53 which is formed in a rectangular shape as illustrated in FIGS. 8 and 10.

As illustrated in FIG. 8, the neutral point forming conductor 53 sequentially includes U-phase connecting portion 53U, V-phase connecting portion 53V, and W-phase connecting portion 53W at a constant interval (interval of approximately 4 slot pitch) in the positive circumferential direction of the stator 11, the U-phase connecting portion 53U for connecting the end portions of the second crossover portions 44 contiguous to the respective 96th element conductors 31, 31 of the first coil 21U1 and the second coil 21U2 of U phase, the V-phase connecting portion 53V for connecting the end portions of the second crossover portions 44 contiguous to the respective 96th element conductors 31, 31 of the first coil 21V1 and the second coil 21V2 of V phase, the W-phase connecting portion 53W connecting the end portions of the second crossover portions 44 contiguous to the respective 96th element conductors 31, 31 of the first coil 21W1 and the second coil 21W2 of W phase.

In FIG. 8, for convenience of illustration, the respective second crossover portions 44 contiguous to the 96th element conductors 31 are illustrated by a dashed line with displacement from the actual position in the radial direction of the stator 11. The second crossover portions 44 are actually arranged in the position of the same layer (the 8th layer as the outermost layer) as the layer of the 96th element conductors 31 in the radial direction of the stator 11.

The neutral point forming conductor 53 is formed such that portion 53a and portion 53b project (protrude) outward of the phase connecting portions 53U, 53V, 53W in the radial direction of the stator 11, the portion 53a being between the U-phase connecting portion 53U and the V-phase connecting portion 53V adjacent in the circumferential direction of the stator 11, the portion 53b being between the V-phase connecting portion 53V and the W-phase connecting portion 53W adjacent in the circumferential direction of the stator 11. The portions 53a, 53b extend in the circumferential direction of the stator 11.

As illustrated in FIG. 8, the U-phase connecting portion 53U, the V-phase connecting portion 53V, and the W-phase connecting portion 53W of the neutral point forming conductor 53 formed in this manner are respectively connected by welding from radially outer side to the end portions of the second crossover portions 44, 44 contiguous to the respective 96th element conductors 31, 31 of the first coil 21X1 and the second coil 21X2 for a corresponding phase, on the second end side in the axial direction of the stator 11.

In this manner, the element conductors 31 (the 96th element conductor 31) on one end side of each of the first coil 21X1 and the second coil 21X2 of any phase of U phase, V phase, and W phase are connected to the neutral point forming conductor 53 as the neutral point 22 in common with the three phases, on the second end side in the axial direction of the stator 11.

Next, in the present embodiment, the element conductor 31 connected to the current I/O terminal 23X of each phase is the 1st element conductor 31 in any of the first coil 21X1 and the second coil 21X2 of each phase.

In the present embodiment, as illustrated in FIGS. 8 and 11, a conductor terminal member 54X (54U, 54V, 54W) connected to the current I/O terminal 23X (23U, 23V, 23W) for each phase via a connecting cord 55X (55U, 55V, 55W) is connected by welding from radially outer side to the end portions of the second crossover portions 44, 44 contiguous to the respective 1st element conductors 31, 31 of the first coil 21X1 and the second coil 21X2 of a corresponding phase, on the second end side in the axial direction of the stator 11.

In this manner, the respective 1st element conductors 31, 31 of the first coil 21X1 and the second coil 21X2 for each phase are connected to the current I/O terminal 23X on the second end side in the axial direction of the stator 11.

In FIG. 8, for convenience of illustration, the respective second crossover portions 44 contiguous to the 1st element conductors 31 are illustrated with displacement from the actual position in the radial direction of the stator 11. The second crossover portions 44 are actually arranged in the position of the same layer (the 8th layer as the outermost layer) as the layer of the 1st element conductors 31 in the radial direction of the stator 11.

In this arrangement, even though the conductor terminal member 54U of U phase overlaps with the neutral point forming conductor 53 in the position in the circumferential direction of the stator 11 as illustrated in FIG. 8, the projection portion 53b (protruding portion in the radial direction) of the neutral point forming conductor 53 is formed so as to face the conductor terminal member 54U at the position of the conductor terminal member 54U. For this reason, the connecting cord 55U between the conductor terminal member 54U and the current I/O terminal 23U can be easily wired.

What is described above is the structure of the coil 21 which is mounted on the stator 11 in the rotary electric machine according to the present embodiment.

According to the present embodiment, a pair of the first element conductor 31 and the second element conductor 31 to be connected via the first crossover portion 43 on the first end side in the axial direction of the stator 11 are inserted in the slots 12, 12 having 5 slot pitch (the second predetermined interval) in the circumferential direction of the stator 11.

Also, a pair of two first element conductors 31 and a pair of two second element conductors 31 to be connected via the second crossover portion 44 on the second end side in the axial direction of the stator 11 are inserted in the slots 12, 12 having 6 slot pitch (the first predetermined interval) in the circumferential direction of the stator 11.

Therefore, the first predetermined interval, which defines the length of the second crossover portion 44 in the circumferential direction of the stator 11, is an interval obtained by multiplying the unit pitch of the slot 12 by the number N (=6) of slots per pole, whereas the second predetermined interval, which defines the length of the first crossover portion 43 in the circumferential direction of the stator 11, is an interval (5 slot pitch) smaller than N×the unit pitch (6 slot pitch).

Thus, in the present embodiment, the total of the first predetermined interval and the second predetermined interval is smaller than twice the length of N×the pitch unit (6 slot pitch). Consequently, in the rotary electric machine in the present embodiment, the total of the maximum height of the first crossover portion 43 and the maximum height of the second crossover portion 44 in the axial direction of the stator 11 can be reduced compared with the above-described conventional rotary electric machine.

As a consequence, the rotary electric machine in the axial direction can be reduced in length and miniaturization thereof can be achieved.

Furthermore, according to the present embodiment, the first predetermined interval and the second predetermined interval are set as described above, and the element conductors 31 including coils of two phases out of U phase, V phase, and W phase are thereby arranged in each of the slots 12 aligned with 2 slot pitch in the circumferential direction of the stator 11 for each of the first coil 21X1 and the second coil 21X2.

Specifically, in FIGS. 3 and 4, the element conductors 13 only including coils of one phase are arranged in each slot 12 with an odd slot number, whereas the element conductors 13 including coils of two phases are arranged in each slot 12 with an even slot number.

In addition, in the present embodiment, the second predetermined interval is an interval of (N−1)×the unit pitch (5 slot pitch) which is smaller than N×the unit pitch (6 slot pitch) by 1 slot pitch.

Thus, the magnetic flux, which is generated by sequentially energizing respective coils 21U, 21V, 21W of U phase, V phase, W phase, has smooth variation in time and smooth distribution in the circumferential direction of the stator 11.

Consequently, variation in torque, which is generated in the rotor of the rotary electric machine, can be inhibited and noise due to the variation in torque can be reduced.

Although the second predetermined interval is set to an interval which is smaller than the first predetermined interval by 1 slot pitch in the embodiment described above, the second predetermined interval may be set to an interval which is smaller than the first predetermined interval by 2 slot pitch or more (for example, 4 slot pitch or 3 slot pitch).

Although the coil 21X (21U, 21V, 21W) of each phase is formed by the first coil 21X1 and the second coil 21X2 connected in parallel in the above embodiment, the coil 21X of each phase may be formed by only one of the first coil 21X1 and the second coil 21X2.

In the above embodiment, coils 21X (21U, 21V, 21W) of three phases are mounted on the stator 11, however, coils of only one phase or coils of only two phases may be mounted.

In the above embodiment, the first coil 21X1 and the second coil 21X2 of each phase are formed by connecting 4 sets of partial coils in series: the 1st to 24th partial coils, the 25th to 48th partial coils, the 49th to 72nd partial coils, and the 73rd to 96th partial coils. However, the coils of each phase may be formed by only one of 4 sets of partial coils or by connecting 2 sets out of the 4 sets of partial coils in series.

Although the segment conductor 40, which is a bundle of four bifurcated conductor members 41, is used in the above embodiment, individual bifurcated conductor members 41 may be separated from each other.

Also, a pair of the first element conductor 31 and the second element conductor 31 to be connected may be connected via a separate first crossover portion without using any bifurcated conductor member 41, or a pair of the first element conductors 31 to be connected and a pair of the second element conductors 31 to be connected may be connected via a separate second crossover portion.

A coil structure for a rotary electric machine according to the present disclosure includes phase coils for magnetic flux generation, the phase coils including a plurality of element conductors inserted in a plurality of slots and arranged as multiple layers in each of the slots in a radial direction of a stator, the slots being formed in the stator and aligned in a circumferential direction of the stator, each of the phase coils being formed by connecting a predetermined number of the element conductors in series, each of the phase coils including: a plurality of first element conductors that are inserted in a plurality of first slots out of the slots, the first slots being arranged at a pitch of a first predetermined interval in the circumferential direction of the stator; a plurality of second element conductors that are inserted in a plurality of second slots arranged at a pitch of the first predetermined interval in the circumferential direction of the stator, the second slots being shifted in phase by a second predetermined interval with respect to the first slots in the circumferential direction of the stator; a plurality of first crossover portions configured to connect pairs of one of the first element conductors and one of the second element conductors on a first end side which is one end side of the stator in the axial direction, each of the pairs of the first element conductor and the second element conductor being to be connected and respectively inserted in one of the first slots and one of the second slots, the one first slot and the one second slot having the second predetermined interval in the circumferential direction of the stator; and a plurality of second crossover portions configured to each connect a pair of two first element conductors or a pair of two second element conductors on a second end side which is the other end side of the axial direction of the stator, the pair of two first element conductors being to be connected and inserted in two first slots having the first predetermined interval in the circumferential direction of the stator, the pair of two second element conductors being to be connected and inserted in two second slots having the first predetermined interval in the circumferential direction of the stator. When unit pitch is defined as an interval between two adjacent slots in the circumferential direction of the stator and N is defined as the number of slots per pole in magnetic poles of the rotary electric machine, the first predetermined interval is set to an interval equivalent to N times the unit pitch, and the second predetermined interval is set to an interval smaller than the first predetermined interval (a first aspect of the present disclosure).

In the following description, k slot pitch refers to the interval which is k times the unit pitch (k is an integer greater than 0).

According to the first aspect of the present disclosure, a pair of the first element conductor and the second element conductor, which are respectively inserted in the first slot and the second slot, are connected by the first crossover portion on the first end side of the stator in the axial direction, the first slot and the second slot having the second predetermined interval (which corresponds to a shift of the phase (phase in the circumferential direction of the stator) of the second slot with respect to the phase of the first slot) in the circumferential direction of the stator.

Also, on the other end side of the stator in the axial direction, a pair of two first element conductors inserted in two first slots having the first predetermined interval in the circumferential direction of the stator, and a pair of two second element conductors inserted in two second slots having the first predetermined interval in the circumferential direction of the stator are each connected by a second crossover portion.

With this connection configuration, the first predetermined interval can be set to the interval of N slot pitch (N is the number slots per pole), the first predetermined interval being the interval (interval in the circumferential direction of the stator) between two slots in which two element conductors (two first element conductors or two second element conductors) to be connected via a second crossover portion are respectively inserted, and the second predetermined interval can be set to an interval smaller than N slot pitch (=the first predetermined interval), the second predetermined interval being the interval (interval in the circumferential direction of the stator) between two slots in which two element conductors (the first element conductor and the second element conductor) to be connected via a first crossover portion are respectively inserted.

That is, the sum of the first predetermined interval and the second predetermined interval can be set to a length smaller than an interval equivalent to twice the N slot pitch.

Therefore, according to the first aspect of the present disclosure, it is possible to reduce the sum of the height of the first crossover portion (the height from the end face of the first end side of the stator in the axial direction) and the height of the second crossover portion (the height from the end face of the second end side of the stator in the axial direction) to a value lower than the value in the above-mentioned conventional case. Eventually, further miniaturization of a rotary electric machine can be achieved by decreasing the axial length of the rotary electric machine.

When the number of phases of coils to be mounted on the stator is two or more, it is possible to arrange element conductors including coils of different phases to one slot. As a consequence, it is possible for the distribution (distribution of the magnetic flux in the circumferential direction of the stator) of the magnetic flux to have smooth variation in time, the magnetic flux being generated when the phase coils are sequentially energized.

Consequently, variation (ripple) in torque, which is generated in the rotor of the rotary electric machine, can be inhibited and noise due to the variation can be reduced.

In the first aspect of the present disclosure, it is preferable that the second predetermined interval is set to an interval of (N−1) times the unit pitch (a second aspect of the present disclosure).

According to the second aspect of the present disclosure, it is possible for the distribution of the magnetic flux to be smooth in the circumferential direction of the stator (the distribution of the magnetic flux in the circumferential direction of the stator is prevented from being dispersed), the magnetic flux being generated when coils of one phase are energized. Eventually, variation (ripple) in torque, which is generated in the rotor of the rotary electric machine, can be inhibited and noise due to the variation can be reduced.

In the first or second aspect of the present disclosure, the following configuration may be adopted: each of the first crossover portions and a pair of the first element conductor and the second element conductor to be connected via the first crossover portion are integrally formed as a bifurcated conductor member which is a conductor member in a bifurcated conductor shape, the bifurcated conductor member including two legs and a leg connection portion, the legs being respectively inserted in the first slot and the second slot that have the second predetermined interval and the legs forming the two element conductors in the element conductor pair, the leg connection portion connecting one ends of the two legs and partially constituting the first crossover portion, in a set of two bifurcated conductor members in which leg A1a forming one of the two first element conductors and leg A1b forming the other of the two first element conductors are respectively inserted in the first two slot, each of the second crossover portions, which connects the pair of the two first element conductors, is formed as a member that connects the respective end portions of the legs A1a, A1b which are protruding through the two first slots to the second end side of the stator such that the end portions are bent to be closer to each other in the circumferential direction of the stator, and in a set of two bifurcated conductor members in which leg A2a forming one of the two second element conductors and leg A2b forming the other of the two second element conductors are respectively inserted in the second two slot, each of the second crossover portions, which connects the pair of the two second element conductors, is formed as a member that connects the respective end portions of the legs A2a, A2b which are protruding through the two second slots to the second end side of the stator such that the end portions are bent to be closer to each other in the circumferential direction of the stator.

In this configuration, it is preferable that the two first element conductors respectively formed by the legs A1a, A1b are arranged in two adjacent layers in the radial direction of the stator, and the two second element conductors respectively formed by the legs A2a, A2b are arranged in other two adjacent layers in the radial direction of the stator, the other two adjacent layers being different from the two layers in which the two first element conductors are arranged (a third aspect of the present disclosure).

According to the third aspect of the present disclosure, a pair of the first element conductor and the second element conductor to be connected and the first crossover portion that connects the pair are integrally formed by the bifurcated conductor member, and thus work of connection between the pair of the first element conductor and the second element conductor on the first end side of the stator in the axial direction is not necessary.

Also, a pair of the first element conductors or a pair of the second element conductors to be connected by the second crossover portion are respectively arranged in two adjacent layers in the radial direction, and thus by bending the end portions of the legs A1a, A1b or A2a, A2b that form a pair of the element conductors to be closer to each other in the circumferential direction, the end portions of the legs can be located close to each other on the second end side of stator in the axial direction.

Consequently, only by connecting the end portions of the legs using welding, connection of a pair of the first element conductors and a pair of the second element conductors to be connected can be easily achieved via the second crossover portion on the second end side of stator in the axial direction.

In the first to third aspects of the present disclosure, it is preferable that multiple pairs of the first element conductor and the second element conductor are respectively arranged in the first slot and the second slot in each of sets of a first slot and a second slot having the second predetermined interval in the circumferential direction of the stator, and the first element conductor and the second element conductor in each of the multiple pairs are respectively arranged in the first slot and the second slot so that the second crossover portions, which connect the first element conductor and the second element conductor in each of the multiple pairs, are aligned in the radial direction of the stator (a fourth aspect of the present disclosure).

According to the fourth aspect of the present disclosure, the second crossover portions, which connect the first element conductor and the second element conductor in each of the plurality of pairs are aligned in the radial direction of the stator. Thus, the second crossover portions corresponding to the plurality of pairs can be molded from a bundle of a plurality of wires in one operation.

Particularly, when the fourth aspect of the present disclosure is applied to the third aspect of the present disclosure, a plurality of bifurcated conductor members (including the second crossover portions) corresponding to the plurality of pairs are aligned in the radial direction of the stator, and thus the plurality of bifurcated conductor members can be molded from a bundle of a plurality of wires in one operation.

Eventually, workload for producing the coils of each phase can be reduced.

In the first to fourth aspects of the present disclosure, the coil of each phase may include a first coil and a second coil which are connected in parallel. In this configuration, it is preferable that each of the first coil and the second coil includes the first element conductors, the second element conductors, the first crossover portions, and the second crossover portions, each of the first element conductors of the second coil is inserted in a slot at the same layer as a layer of the first element conductor of the first coil, the slot being adjacent in the circumferential direction of the stator to the first slot in which one of the first element conductors of the first coil is inserted, and each of the second element conductors of the second coil is inserted in a slot at the same layer as a layer of the second element conductor of the first coil, the slot being adjacent in the circumferential direction of the stator to the second slot in which one of the second element conductors of the first coil is inserted (a fifth aspect of the present disclosure).

According to the fifth aspect of the present disclosure, in the first coil and the second coil, the slots in which the first element conductors are arranged are adjacent to each other, and the layers (layers in the radial direction of the stator) in which the first element conductors are arranged are the same. Similarly, in the first coil and the second coil, the slots in which the second element conductors are arranged are adjacent to each other, and the layers in which the second element conductors are arranged are the same.

Therefore, the arrangements and connection configurations of the element conductors that constitute the first coil and the second coil can be identical. As a consequence, the first coil and the second coil can be easily manufactured and can have identical characteristics.

In contrast to the case where each phase coil includes only one of the first coil and the second coil, the amount of current that flows through the first coil and the second coil can be reduced. Consequently, the thickness of the element conductors, the first crossover portion, and the second crossover portion that constitute the first coil and the second coil can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A coil structure for a rotary electric machine, the coil structure comprising phase coils for magnetic flux generation, the phase coils including a plurality of element conductors inserted in a plurality of slots and arranged as multiple layers in each of the slots in a radial direction of a stator, the slots being formed in the stator and aligned in a circumferential direction of the stator, each of the phase coils being formed by connecting a predetermined number of the element conductors in series, each of the phase coils including:
a plurality of first element conductors that are inserted in a plurality of first slots out of the slots, the first slots being arranged at a pitch of a first predetermined interval in the circumferential direction of the stator;
a plurality of second element conductors that are inserted in a plurality of second slots arranged at a pitch of the first predetermined interval in the circumferential direction of the stator, the second slots being shifted in phase by a second predetermined interval with respect to the first slots in the circumferential direction of the stator;

a plurality of first crossover portions configured to connect pairs of one of the first element conductors and one of the second element conductors on a first end side which is one end side of the stator in the axial direction, each of the pairs of the first element conductor and the second element conductor configured to be connected and respectively inserted in one of the first slots and one of the second slots, the one first slot and the one second slot having the second predetermined interval in the circumferential direction of the stator; and a plurality of second crossover portions configured to each connect a pair of two first element conductors or a pair of two second element conductors on a second end side which is the other end side of the axial direction of the stator, the pair of two first element conductors configured to be connected and inserted in two first slots having the first predetermined interval in the circumferential direction of the stator, the pair of two second element conductors configured to be connected and inserted in two second slots having the first predetermined interval in the circumferential direction of the stator, wherein when unit pitch is defined as an interval between two adjacent slots in the circumferential direction of the stator and N is defined as the number of slots per pole in magnetic poles of the rotary electric machine, the first predetermined interval is set to an interval equivalent to N times the unit pitch, and the second predetermined interval is set to an interval smaller than the first predetermined interval, and wherein each phase coil has one of the plurality of first element conductors connected via a bridge conductor to another one of the plurality of first element conductors of the same phase coil, the one of the plurality of first element conductors and the other one of the plurality of first element conductors being arranged at a third predetermined interval in the circumferential direction of the stator, the third predetermined interval being larger than the first predetermined interval.

2. The coil structure according to claim 1, wherein the second predetermined interval is set to an interval of (N−1) times the unit pitch.

3. The coil structure according to claim 1, wherein each of the first crossover portions and a pair of the first element conductor and the second element conductor to be connected via the first crossover portion are integrally formed as a bifurcated conductor member which is a conductor member in a bifurcated conductor shape, the bifurcated conductor member including two legs and a leg connection portion, the legs being respectively inserted in the first slot and the second slot that have the second predetermined interval and the legs forming the two element conductors in the element conductor pair, the leg connection portion connecting one ends of the two legs and partially constituting the first crossover portion, in a set of two bifurcated conductor members in which leg A1a forming one of the two first element conductors and leg A1b forming the other of the two first element conductors are respectively inserted in the two first slots, each of the second crossover portions, which connects the pair of the two first element conductors, is formed as a member that connects the respective end portions of the legs A1a, A1b which are protruding through the two first slots to the second end side of the stator such that the end portions are bent to be closer to each other in the circumferential direction of the stator, in a set of two bifurcated conductor members in which leg A2a forming one of the two second element conductors and leg A2b forming the other of the two second element conductors are respectively inserted in the two second slots, each of the second crossover portions, which connects the pair of the two second element conductors, is formed as a member that connects the respective end portions of the legs A2a, A2b which are protruding through the two second slots to the second end side of the stator such that the end portions are bent to be closer to each other in the circumferential direction of the stator, and the two first element conductors respectively formed by the legs A1a, A1b are arranged in two adjacent layers in the radial direction of the stator, and the two second element conductors respectively formed by the legs A2a, A2b are arranged in other two adjacent layers in the radial direction of the stator, the other two adjacent layers being different from the two layers in which the two first element conductors are arranged.

4. The coil structure according to claim 1, wherein multiple pairs of the first element conductor and the second element conductor are respectively arranged in the first slot and the second slot in each of sets of a first slot and a second slot having the second predetermined interval in the circumferential direction of the stator, and the first element conductor and the second element conductor in each of the multiple pairs are respectively arranged in the first slot and the second slot so that the first crossover portions, which connect the first element conductor and the second element conductor in each of the multiple pairs, are aligned in the radial direction of the stator.

5. The coil structure according to claim 1, wherein the coil of each phase includes a first coil and a second coil which are connected in parallel, each of the first coil and the second coil includes the first element conductors, the second element conductors, the first crossover portions, and the second crossover portions, each of the first element conductors of the second coil is inserted in a slot at the same layer as a layer of the first element conductor of the first coil, the slot being adjacent in the circumferential direction of the stator to the first slot in which one of the first element conductors of the first coil is inserted, and each of the second element conductors of the second coil is inserted in a slot at the same layer as a layer of the second element conductor of the first coil, the slot being adjacent in the circumferential direction of the stator to the second slot in which one of the second element conductors of the first coil is inserted.

6. A coil structure for a rotary electric machine, comprising:

phase coils for magnetic flux generation including a plurality of linear element conductors provided in a plurality of slots and arranged as multiple layers in each of the slots in a radial direction of a stator, the slots being provided in the stator and aligned in a circumferential direction of the stator, each of the phase coils including a predetermined number of the element conductors connected in series and comprising:

a plurality of first element conductors provided in a plurality of first slots among the slots, the first slots being provided in the circumferential direction of the stator at a pitch of a first predetermined interval;

a plurality of second element conductors provided in a plurality of second slots among the slots, the second slots being provided in the circumferential direction of the stator at the pitch of the first predetermined interval, the second slots being shifted in phase by a second predetermined interval with respect to the first slots in the circumferential direction of the stator;

a plurality of first crossover portions connecting pairs of one of the first element conductors and one of the second element conductors on a first end side which is one end side of the stator in the axial direction, each of the pairs configured to be connected and respectively inserted into one of the first slots and one of the second slots, the one first slot and the one second slot having the second predetermined interval in the circumferential direction of the stator;

a plurality of second crossover portions each connecting a pair of two first element conductors or a pair of two second element conductors on a second end side which is the other end side of the axial direction of the stator, the pair of two first element conductors configured to be connected and inserted into two first slots having the first predetermined interval in the circumferential direction of the stator, the pair of two second element conductors configured to be connected and inserted into two second slots having the first predetermined interval in the circumferential direction of the stator;

the first predetermined interval being set to be an interval equivalent to N times a unit pitch, the second predetermined interval being set to be an interval smaller than the first predetermined interval, the unit pitch being defined as an interval between two adjacent slots in the circumferential direction of the stator and N is defined as a number of slots per pole in magnetic poles of the rotary electric machine; and each phase coil has one of the plurality of first element conductors being connected via a bridge conductor to another one of the plurality of first element conductors of the same phase coil, the one of the plurality of first element conductors and the other one of the plurality of first element conductors being arranged at a third predetermined interval in the circumferential direction of the stator, the third predetermined interval being larger than the first predetermined interval.

7. The coil structure according to claim 6,
wherein the second predetermined interval is set to an interval of (N−1) times the unit pitch.

8. The coil structure according to claim 6,
wherein each of the first crossover portions and a pair of the first element conductor and the second element conductor to be connected via the first crossover portion are integrally provided as a bifurcated conductor member which is a conductor member in a bifurcated conductor shape, the bifurcated conductor member including two legs and a leg connection portion, the legs being respectively inserted into the first slot and the second slot that have the second predetermined interval and the legs providing the two element conductors in the element conductor pair, the leg connection portion connecting one ends of the two legs and partially constituting the first crossover portion, in a set of two bifurcated conductor members in which leg A1a providing one of the two first element conductors and leg A1b providing the other of the two first element conductors are respectively inserted into the two first slots, each of the second crossover portions, which connects the pair of the two first element conductors, is provided as a member that connects the respective end portions of the legs A1a, A1b which are protruding through the two first slots to the second end side of the stator such that the end portions are bent to be closer to each other in the circumferential direction of the stator, in a set of two bifurcated conductor members in which leg A2a providing one of the two second element conductors and leg A2b providing the other of the two second element conductors are respectively inserted into the two second slots, each of the second crossover portions, which connects the pair of the two second element conductors, is provided as a member that connects the respective end portions of the legs A2a, A2b which are protruding through the two second slots to the second end side of the stator such that the end portions are bent to be closer to each other in the circumferential direction of the stator, and the two first element conductors respectively provided by the legs A1a, A1b are arranged in two adjacent layers in the radial direction of the stator, and the two second element conductors respectively provided by the legs A2a, A2b are arranged in other two adjacent layers in the radial direction of the stator, the other two adjacent layers being different from the two layers in which the two first element conductors are arranged.

9. The coil structure according to claim 6,
wherein multiple pairs of the first element conductor and the second element conductor are respectively arranged in the first slot and the second slot in each of sets of a first slot and a second slot having the second predetermined interval in the circumferential direction of the stator, and the first element conductor and the second element conductor in each of the multiple pairs are respectively arranged in the first slot and the second slot so that the second crossover portions, which connect the first element conductor and the second element conductor in each of the multiple pairs, are aligned in the radial direction of the stator.

10. The coil structure according to claim 6,
wherein the coil of each phase includes a first coil and a second coil which are connected in parallel, each of the first coil and the second coil includes the first element conductors, the second element conductors, the first crossover portions, and the second crossover portions, each of the first element conductors of the second coil is inserted into a slot at the same layer as a layer of the first element conductor of the first coil, the slot being adjacent in the circumferential direction of the stator to the first slot into which one of the first element conductors of the first coil is inserted, and each of the second element conductors of the second coil is inserted into a slot at the same layer as a layer of the second element conductor of the first coil, the slot being adjacent in the circumferential direction of the stator to the second slot into which one of the second element conductors of the first coil is inserted.

11. The coil structure according to claim 1,
wherein the third predetermined interval is set to an interval of (N+1) times the unit pitch.

12. The coil structure according to claim 1,
wherein eight element conductors of the first and second element conductors are configured to be inserted in each of the plurality of first slots and the plurality of second slots.

13. The coil structure according to claim 6,
wherein the third predetermined interval is set to an interval of (N+1) times the unit pitch.

14. The coil structure according to claim 6,
wherein eight element conductors of the first and second element conductors are configured to be inserted in each of the plurality of first slots and the plurality of second slots.

15. A coil structure for a rotary electric machine, the coil structure comprising phase coils for magnetic flux generation, the phase coils including a plurality of element conductors inserted in a plurality of slots and arranged as multiple layers in each of the slots in a radial direction of a stator, the slots being formed in the stator and aligned in a circumferential direction of the stator, each of the phase coils being formed by connecting a predetermined number of the element conductors in series, each of the phase coils including:

a plurality of first element conductors configured to be inserted in a plurality of first slots out of the slots, the first slots being arranged at a pitch of a first predetermined interval in the circumferential direction of the stator;

a plurality of second element conductors configured to be inserted in a plurality of second slots out of the slots;

a plurality of first crossover portions configured to connect pairs of one of the first element conductors and one of the second element conductors on a first end side of the stator in the axial direction, each of the pairs of the first element conductor and the second element conductor being spaced from each other by a second interval; and a plurality of second crossover portions configured to each connect a pair of two first element conductors or a pair of two second element conductors on a second end side of the stator in the axial direction, the pair of two second element conductors being spaced from each other by the first predetermined interval, wherein when unit pitch is defined as an interval between two adjacent slots in the circumferential direction of the stator and N is defined as the number of slots per pole in magnetic poles of the rotary electric machine, the first predetermined interval is equivalent to N times the unit pitch, and the second predetermined interval is smaller than the first predetermined interval, and wherein each phase coil has one of the plurality of first element conductors connected via a bridge conductor to another one of the plurality of first element conductors of the same phase coil, the one of the plurality of first element conductors being spaced from the other one of the plurality of first element conductors by a third predetermined interval in the circumferential direction of the stator, the third predetermined interval being larger than the first predetermined interval.

* * * * *